United States Patent [19]
Khaira et al.

[11] Patent Number: 5,357,512
[45] Date of Patent: Oct. 18, 1994

[54] CONDITIONAL CARRY SCHEDULER FOR ROUND ROBIN SCHEDULING

[75] Inventors: Manpreet S. Khaira; Nitin Y. Borkar, both of Beaverton, Oreg.

[73] Assignee: Intel Corporation, Santa Clara, Calif.

[21] Appl. No.: 998,945

[22] Filed: Dec. 30, 1992

[51] Int. Cl.[5] .................... H04L 12/40; G06F 13/00
[52] U.S. Cl. ............................... 370/85.2; 364/242.6; 395/725; 370/85.11
[58] Field of Search .................... 370/85.1, 85.2, 85.3, 370/85.4, 85.5, 85.7, 85.9, 85.11, 85.12, 95.1, 119; 395/725, 325; 364/787, 788, 242.6, 242.7, 242.8, 242.9, 242.91, 242.92, 242.93

[56] References Cited

U.S. PATENT DOCUMENTS

| | | | |
|---|---|---|---|
| 4,375,639 | 3/1983 | Johnson, Jr. | 340/825.5 |
| 4,449,183 | 5/1984 | Flahive et al. | 364/200 |
| 4,499,538 | 2/1985 | Finger et al. | 364/200 |
| 4,536,839 | 8/1985 | Shah et al. | 364/200 |
| 4,669,079 | 5/1987 | Blum | 370/85.11 |
| 4,763,122 | 8/1988 | Franaszek | 340/825.51 |
| 4,924,380 | 5/1990 | McKinney et al. | 364/200 |
| 4,964,034 | 10/1990 | Jaskowiak | 364/200 |
| 5,072,363 | 12/1991 | Gallagher | 395/725 |
| 5,179,705 | 1/1993 | Kent | 395/725 |
| 5,276,635 | 1/1994 | Naini et al. | 364/787 |

FOREIGN PATENT DOCUMENTS 1099575 1/1987 United Kingdom .

OTHER PUBLICATIONS

Bertsekas, Dimitri and Gallager, Robert, "Data Networks", *Prentice-Hall, Inc.*, 1987, pp. 258-270.
Haldar, S. and Subramanian, D. K., "Fairness in Processor Scheduling in Time Sharing Systems", pp. 4-18.
Hennessy, John L., and Patterson, David A., "Computer Architecture A Quantitative Approach", *Morgan Kaufman Publishers, Inc.*, 1990, pp. A-2 through A-3, A31-A39.
Lee, K. C., "A Variable Round-Robin Arbiter for High Speed Buses and Statistical Multiplexers", *IEEE*, 1991, pp. 24-29.
Sharma, D. K. and Ahuja, S. R., "A First-Come First-Serve Bus-Allocation Scheme Using Ticket Assignments", *The Bell System Technical Journal*, vol. 60, No. 7, Sep. 1981, pp. 1257-1269.
Vernon, Mary K. and Manber, Udi, "Distributed Round-Robin and First-Come First-Serve Protocols and their Application to Multiprocessor Bus Arbitration", *SCIC,* Mar. 1988, pp. 10-18.

*Primary Examiner*—Douglas W. Olms
*Assistant Examiner*—Hassan Kizou
*Attorney, Agent, or Firm*—Blakely, Sokoloff, Taylor & Zafman

[57] ABSTRACT

A conditional carry scheduling unit that performs a scheduler carry operation for a round robin scheduler that schedules communication among a plurality of clients who compete to use a shared resource. Each client asserts a request bit to request use of the shared resource, and receives a grant bit from the round robin scheduler that is asserted when the client is scheduled to use the shared resource. The conditional carry scheduling unit includes a plurality of 2-bit carry generation units that operate in parallel. Within each of the 2-bit carry generation units except the initial carry generation unit, two conditional output signals are produced and supplied to a multiplexer tree. The initial carry generation unit assumes a carryin bit of zero, and outputs its carryout bit to the multiplexer tree which determines the actual carries and supplies them back to the carry generation units. Each carry generation unit includes a second multiplexer tree to select the carryout bits (the "SC result bits") from each bit position. If the carryout bit from the final carry generation unit is zero, then the SC result bits for the initial operation provide the grant word for the current scheduling cycle, but if the carryout bit is one, the above scheduler carry operation is repeated assuming a carryin bit of one. To increase speed of operation, parallel branches may be provided, so that two scheduler carry operations can be performed in parallel and the correct grant word selected after the carryout bit is known.

8 Claims, 19 Drawing Sheets

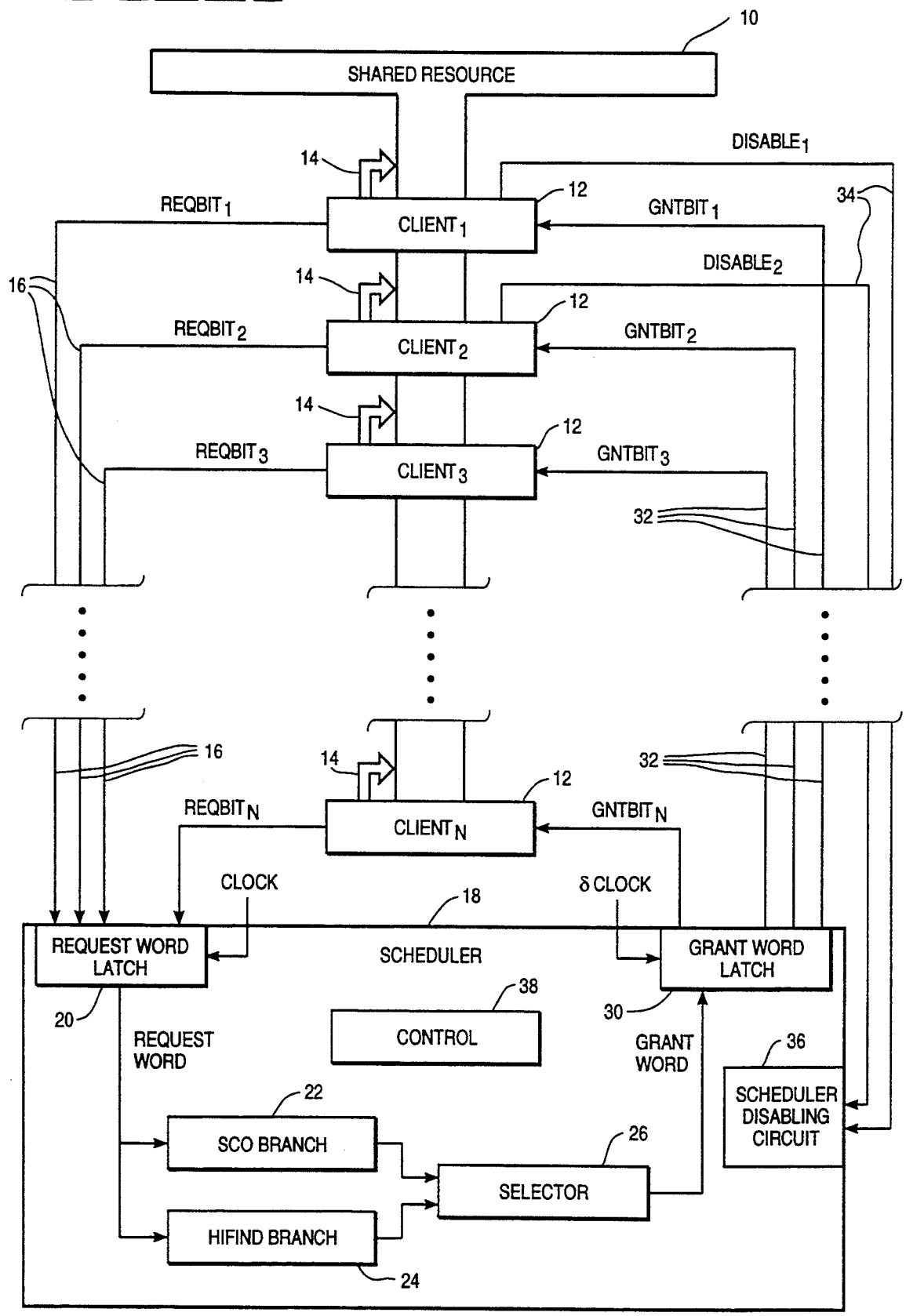

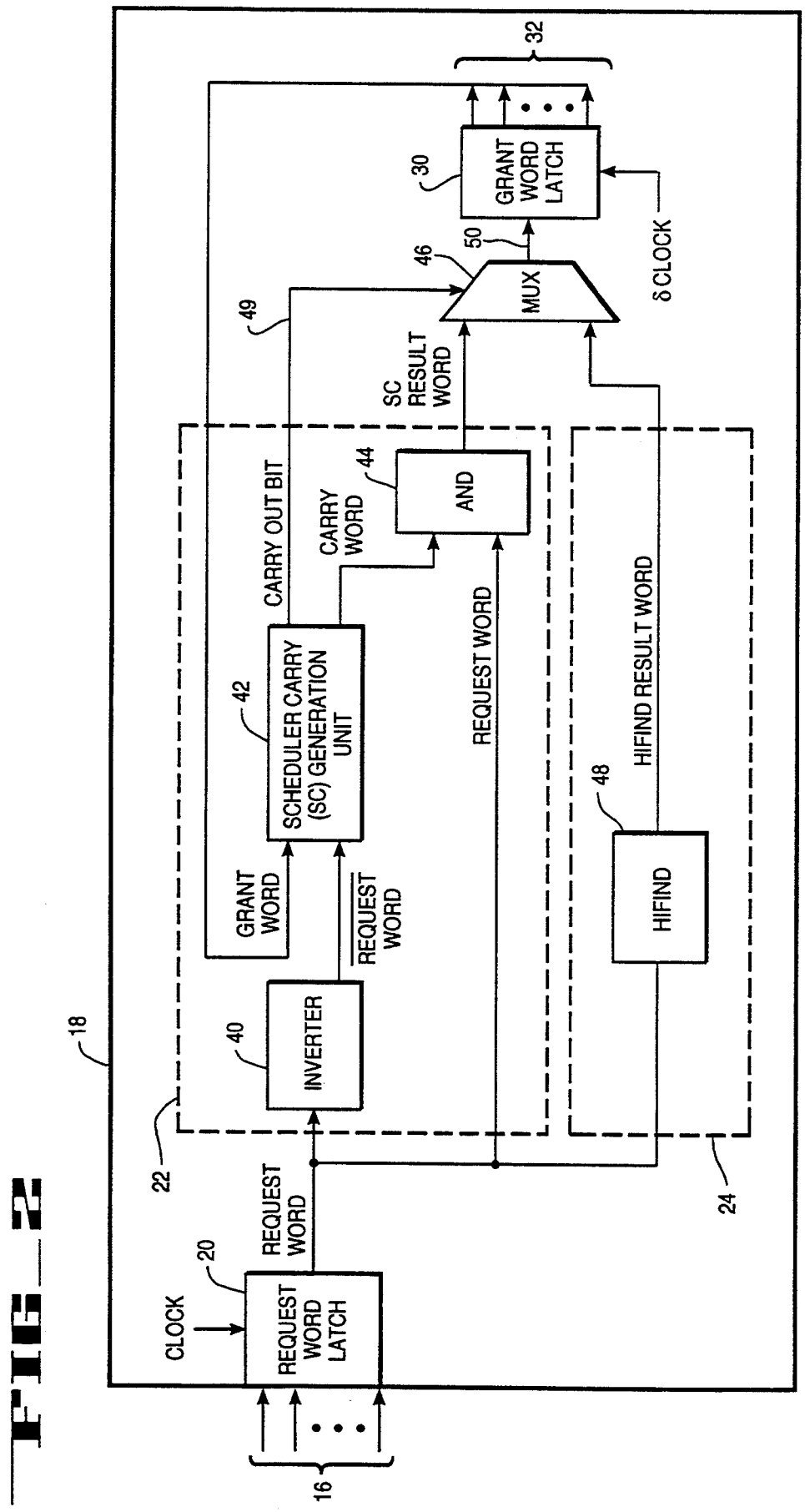
FIG_2

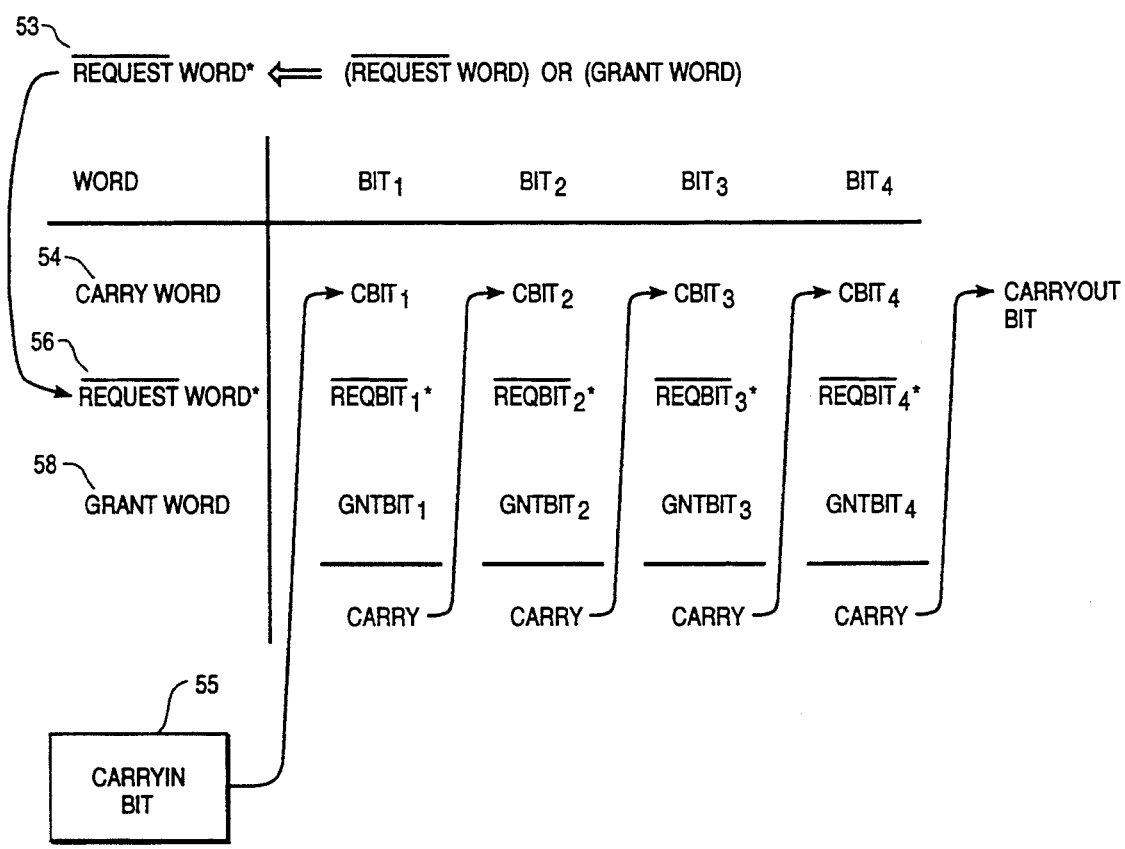

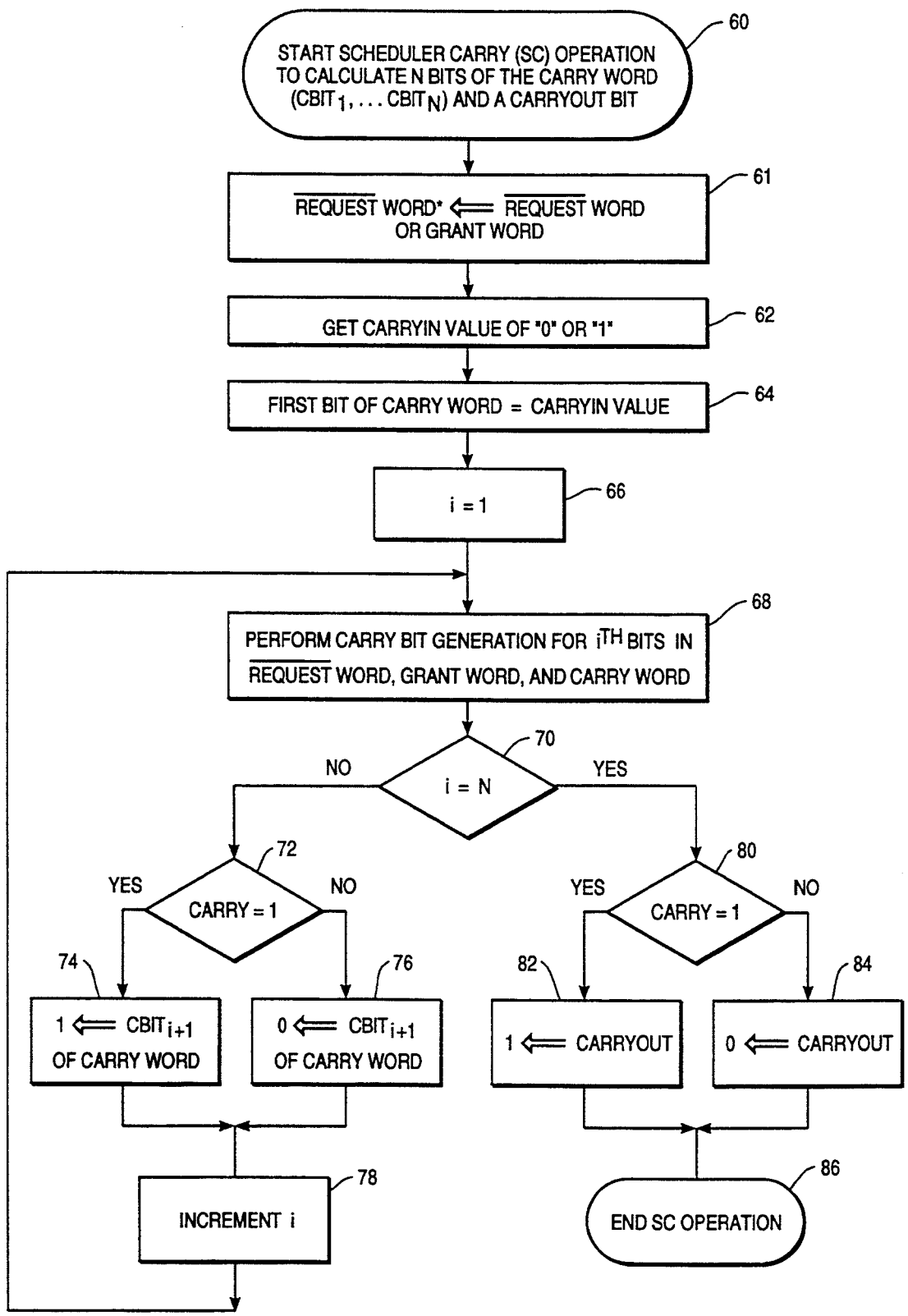

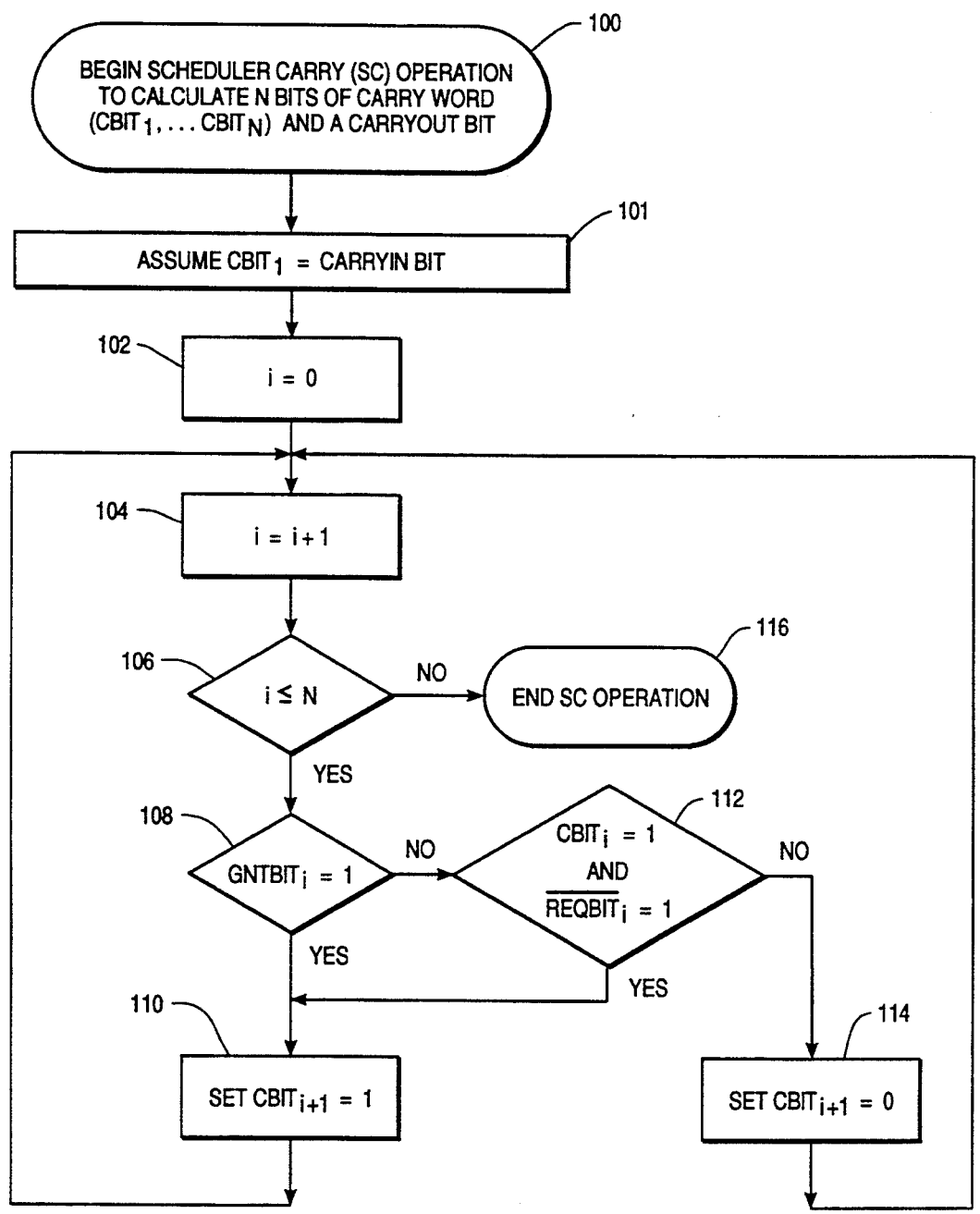
FIG_5

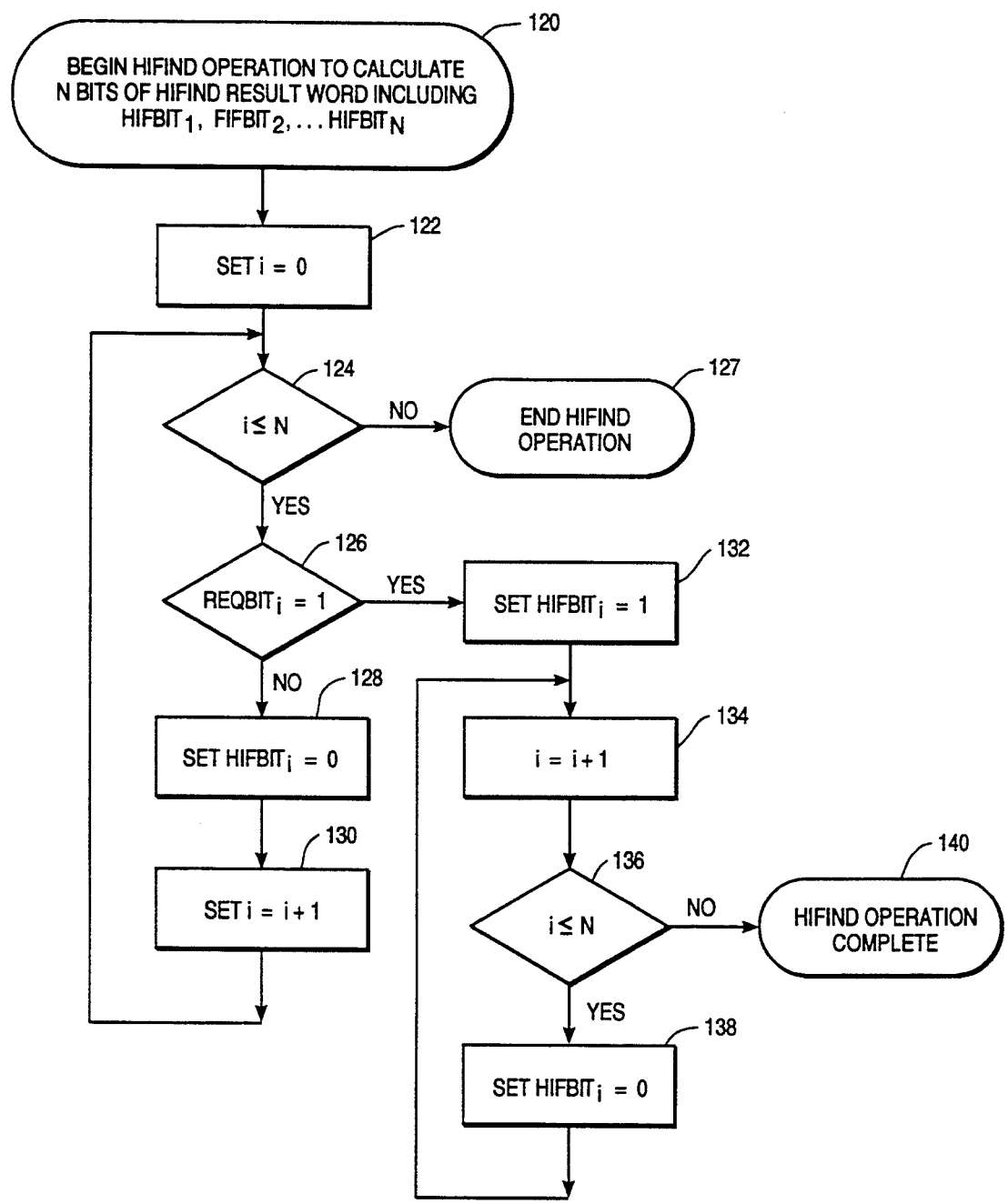

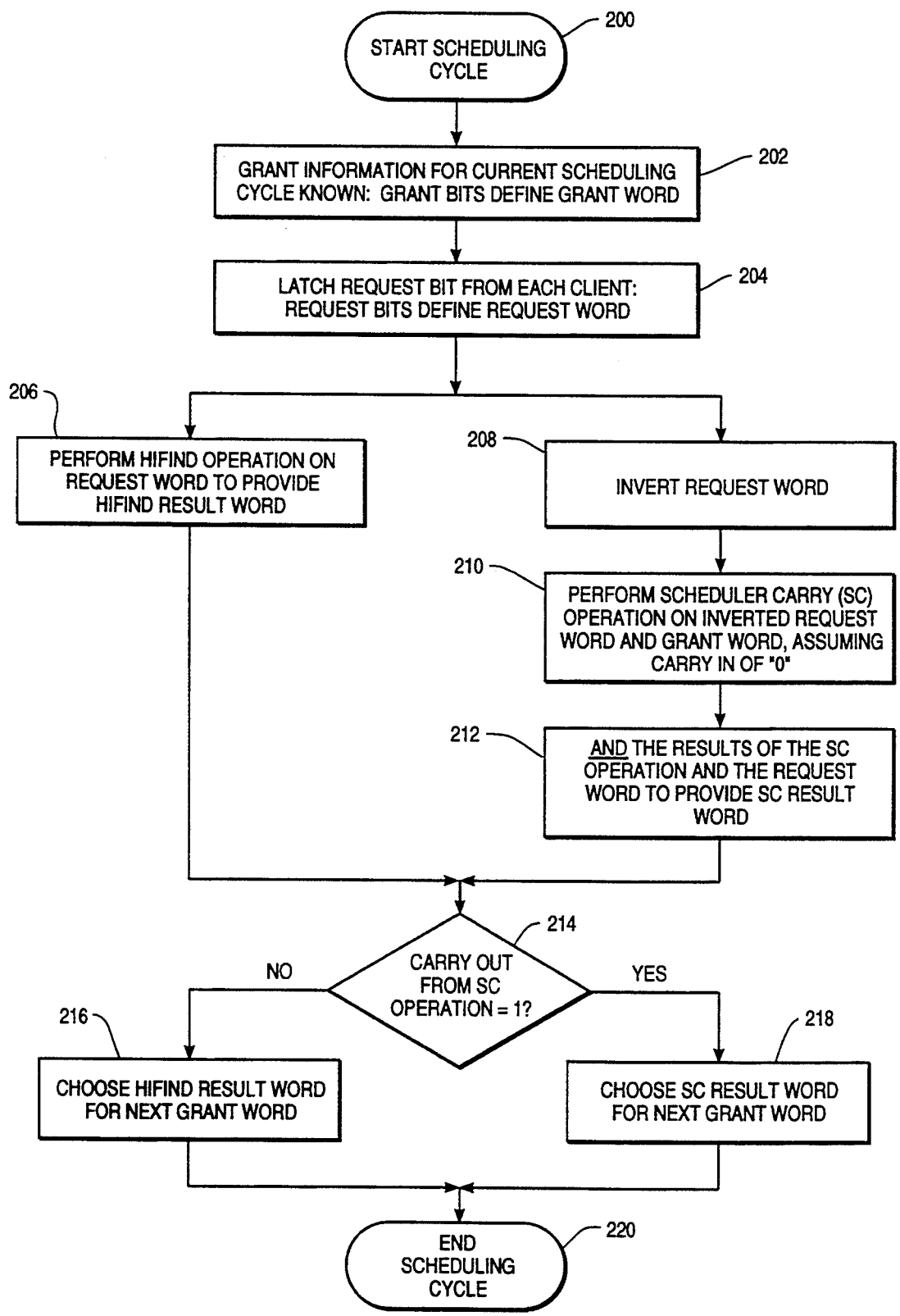

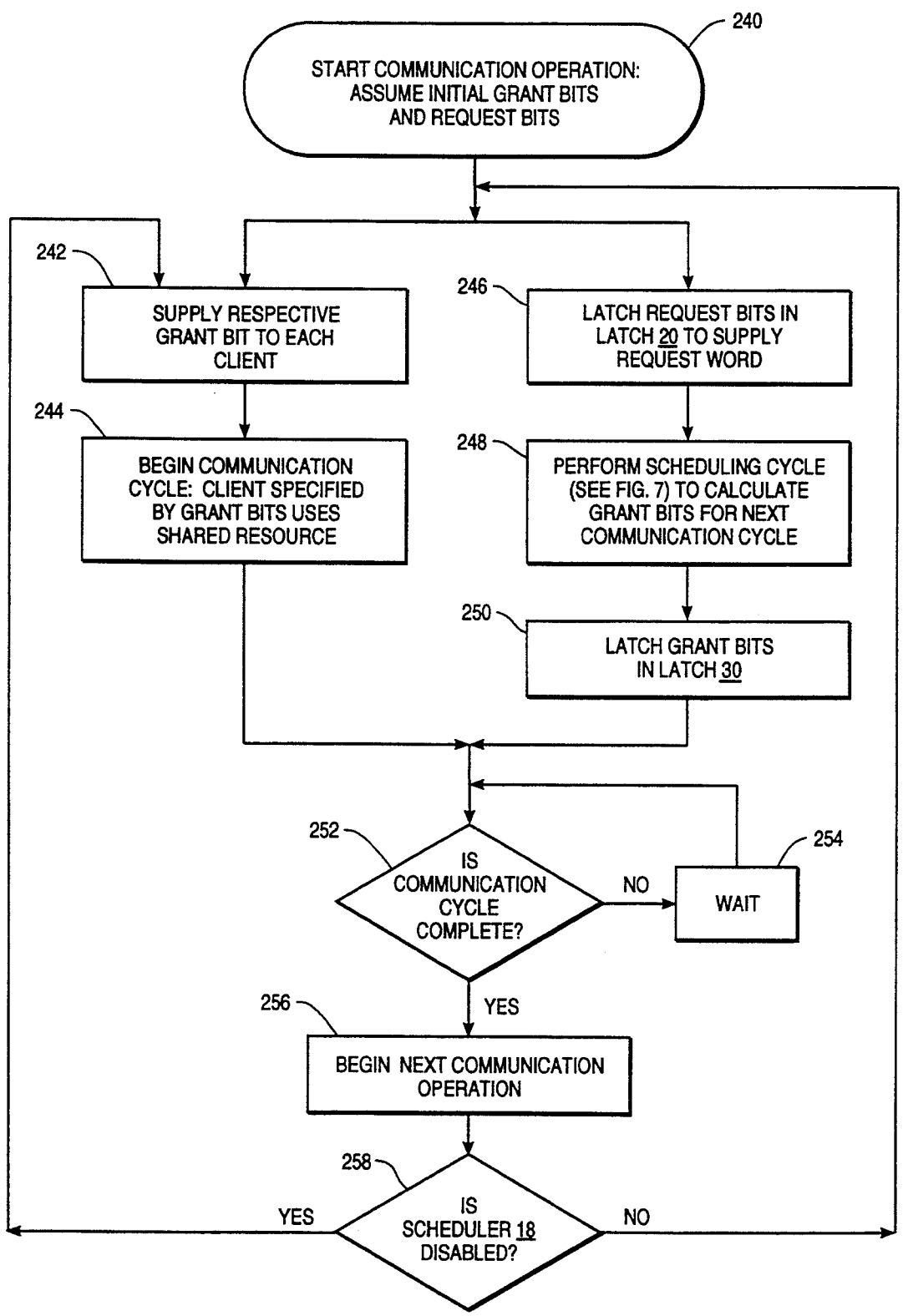

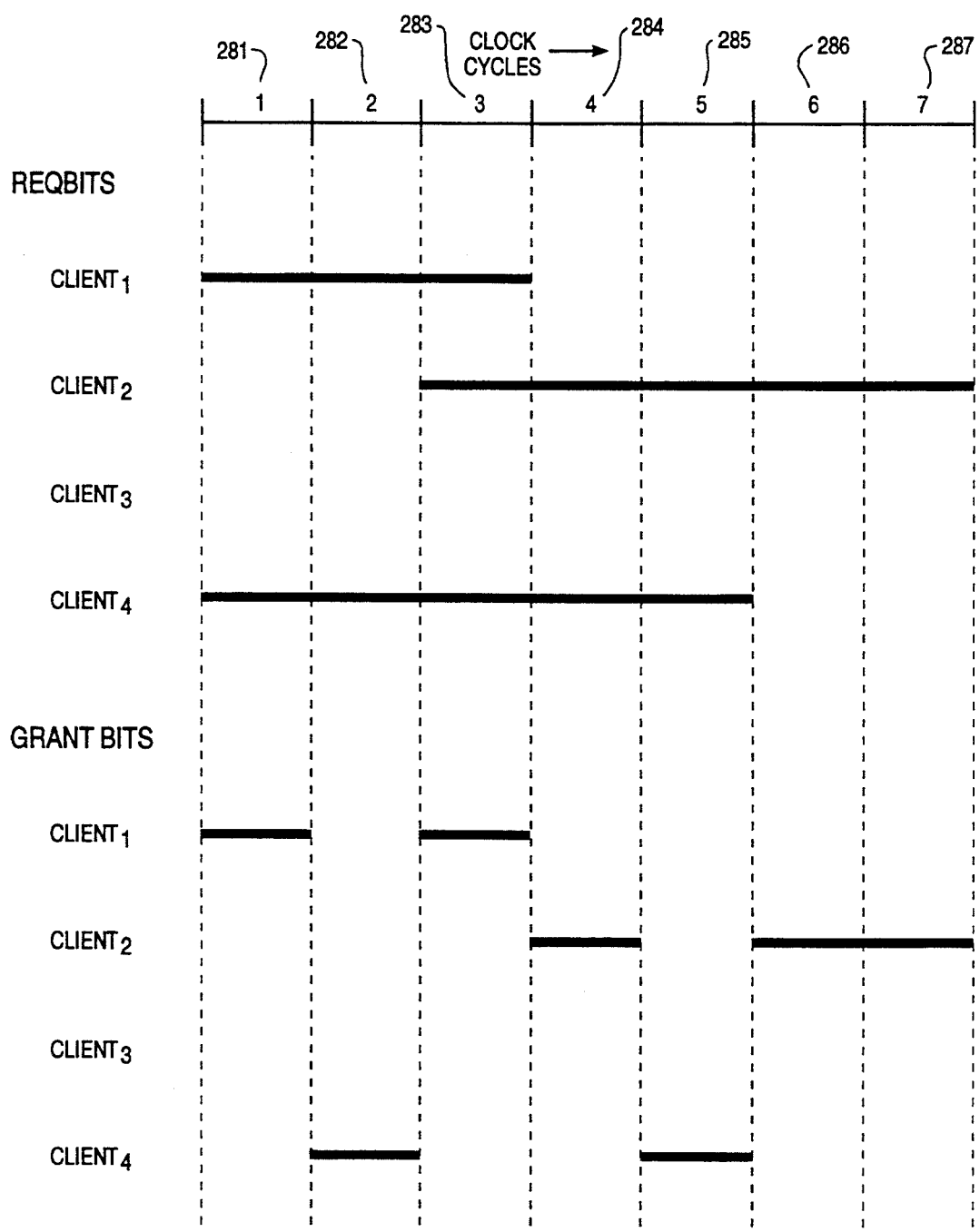

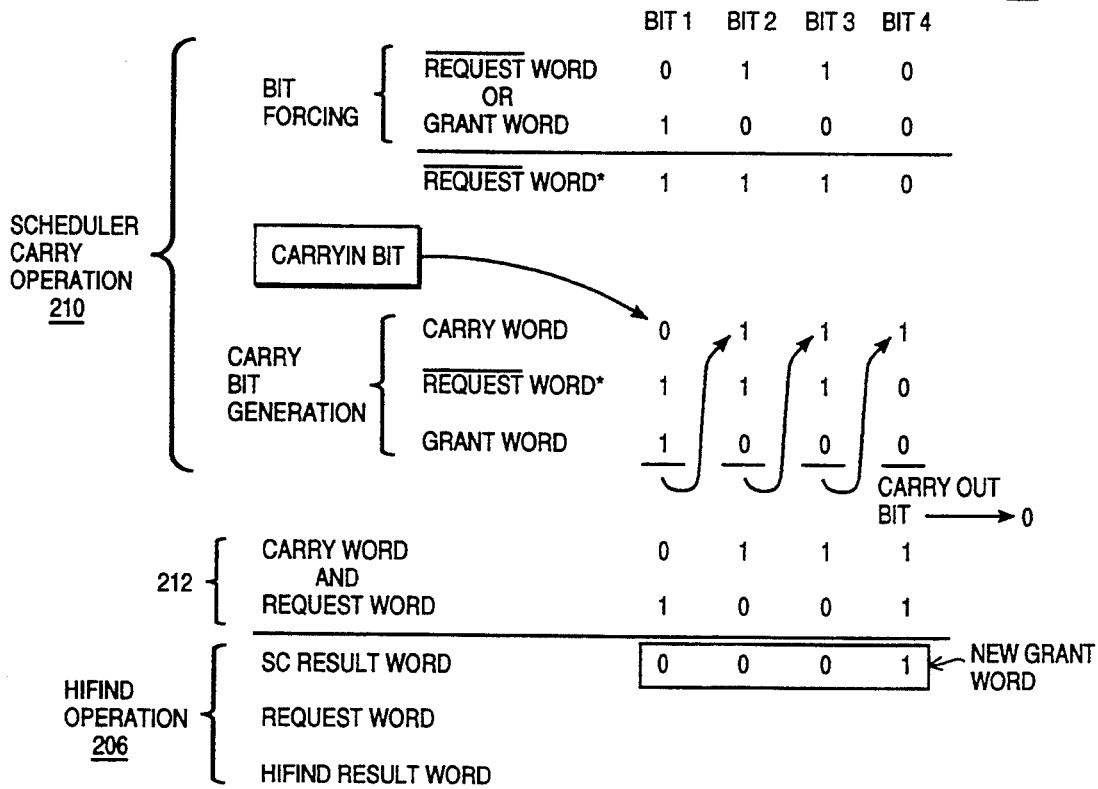
FIG_10A
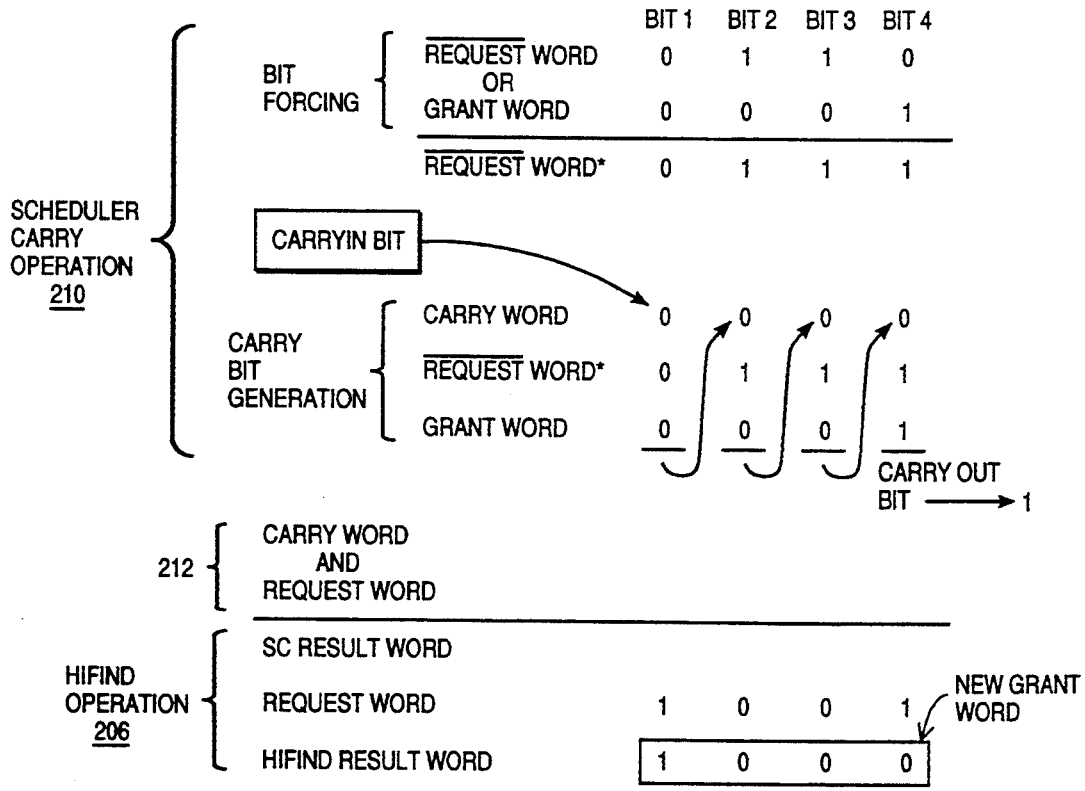
FIG_10B

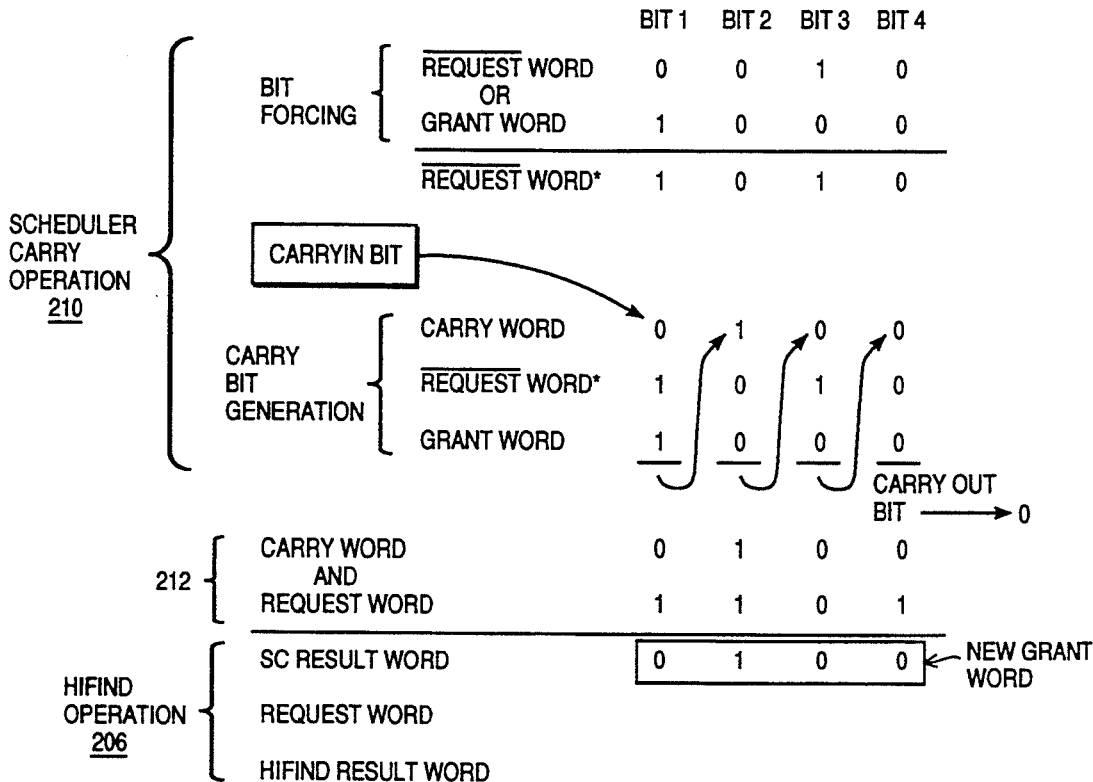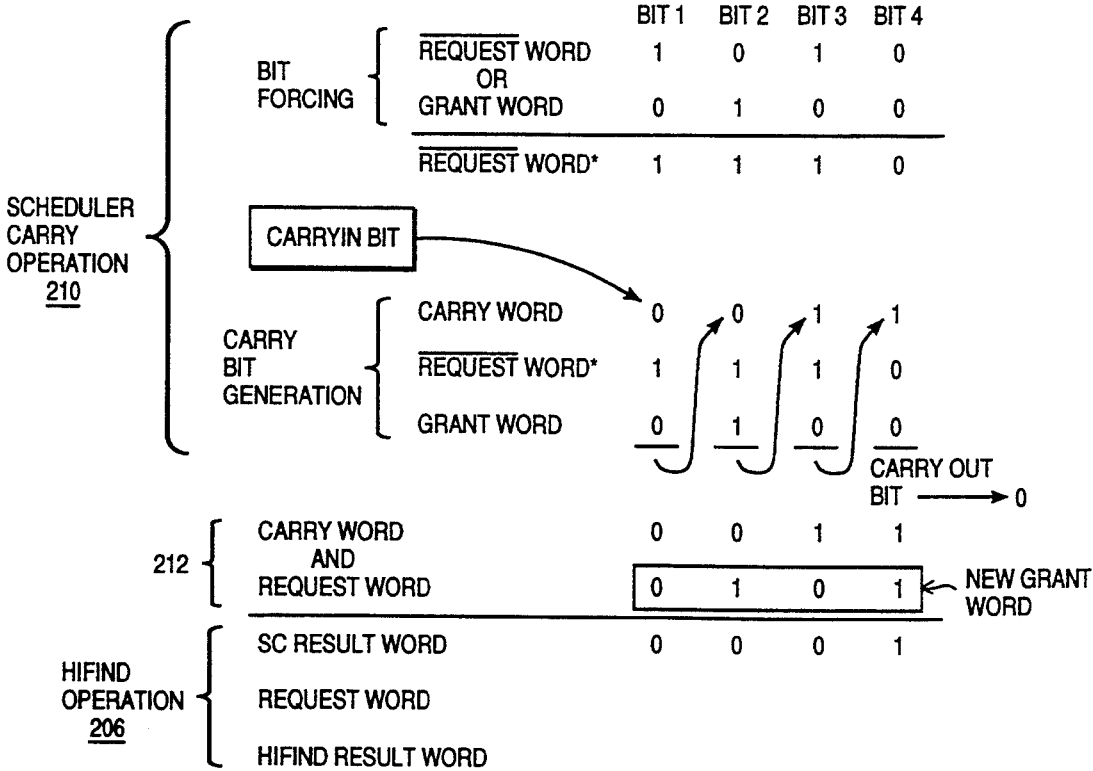

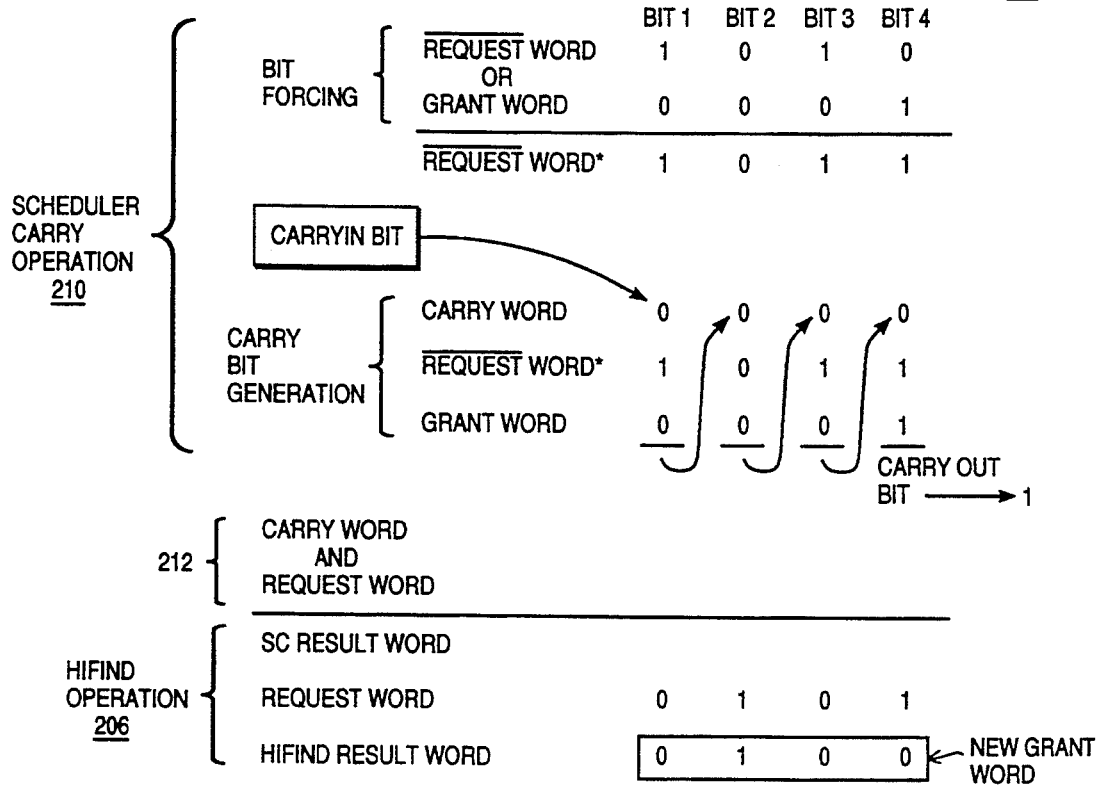
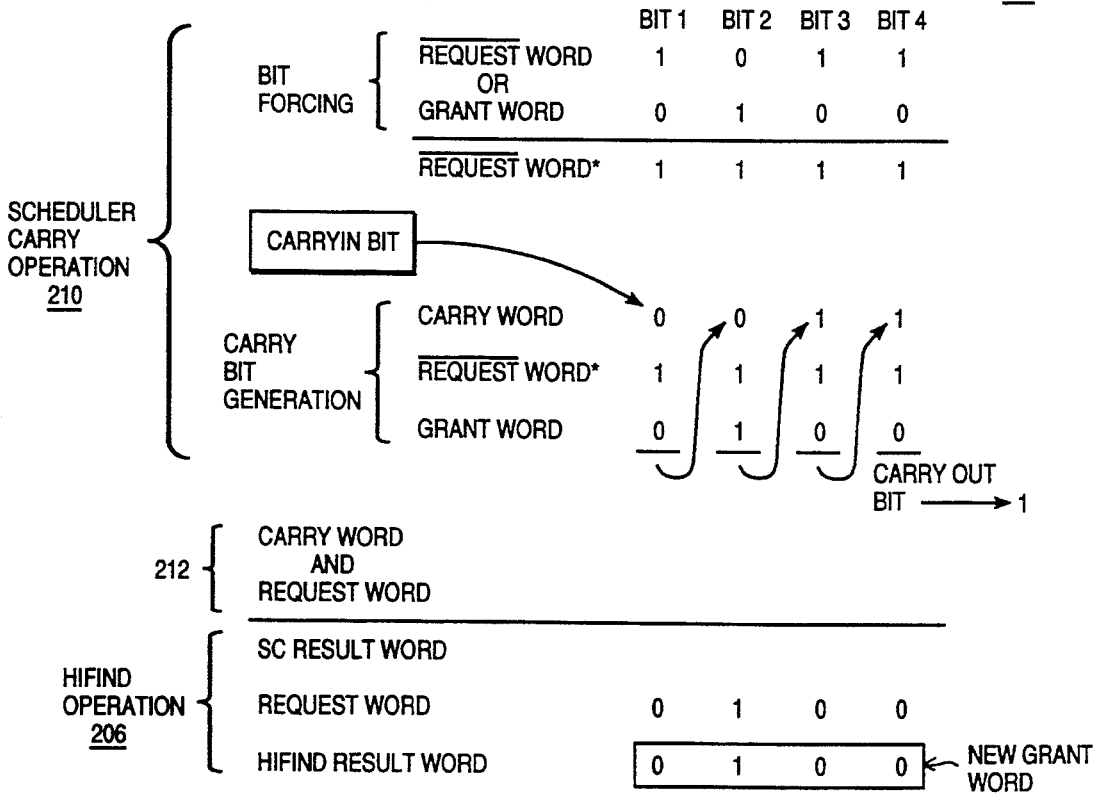

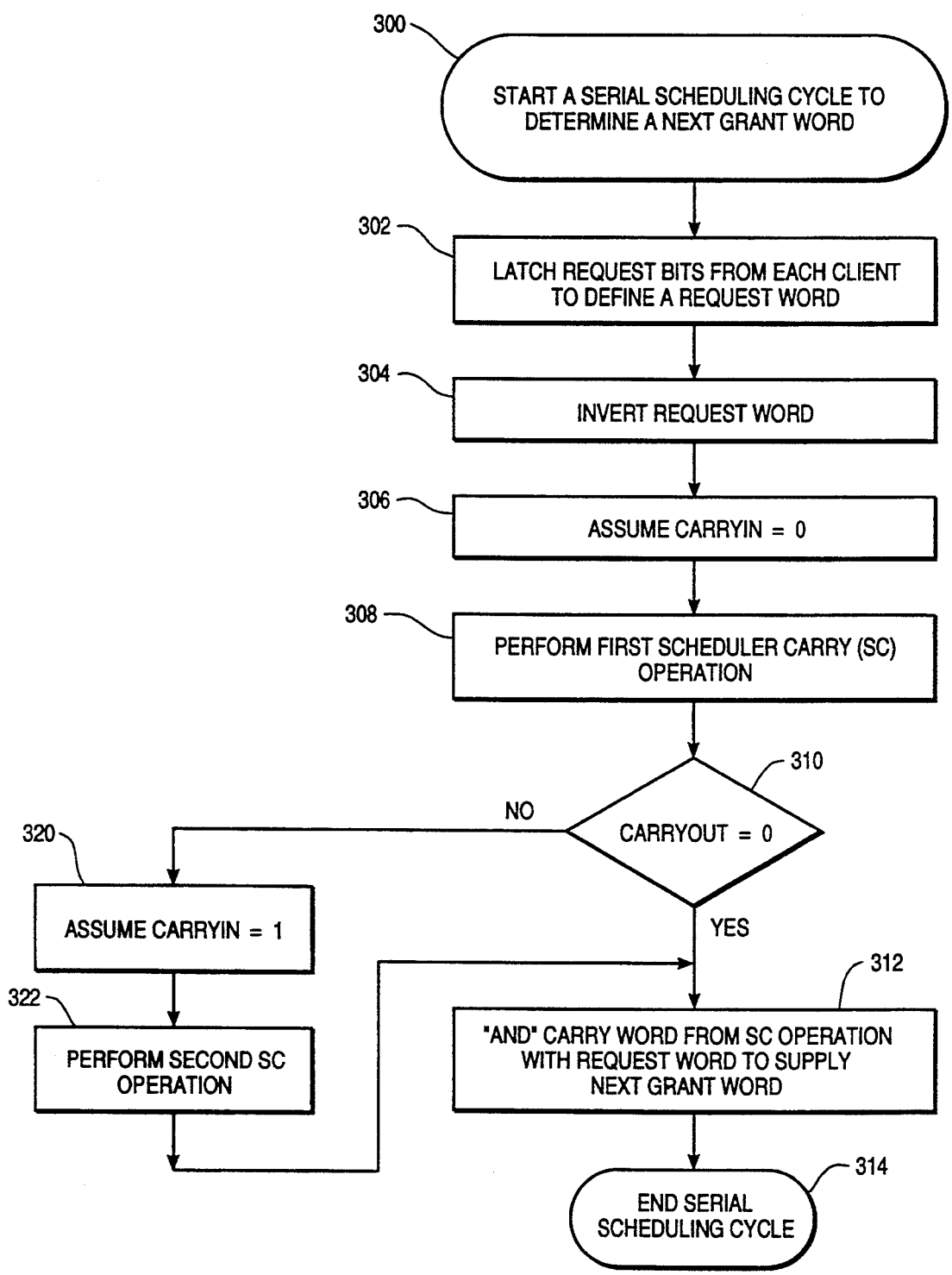

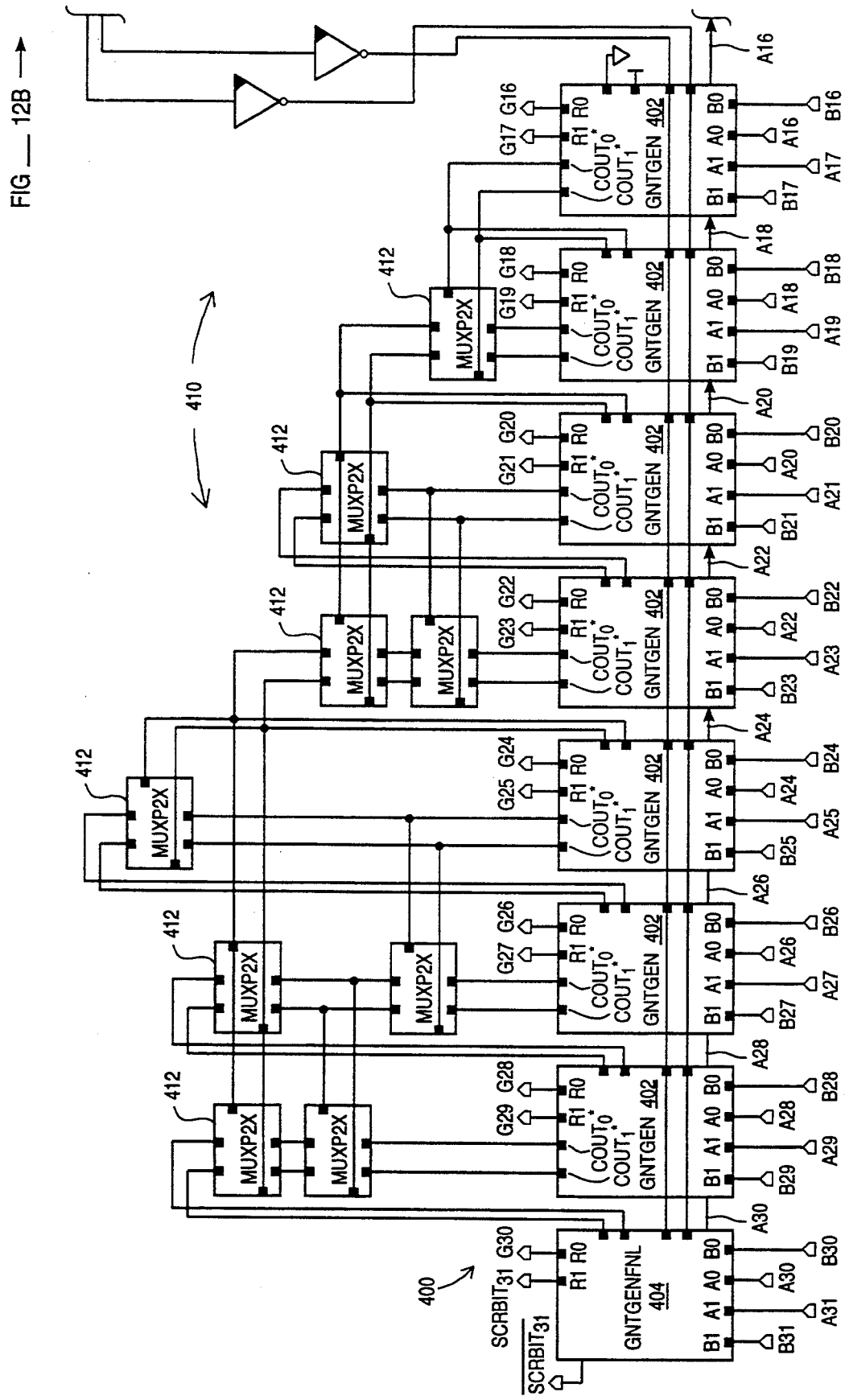
FIG_12A

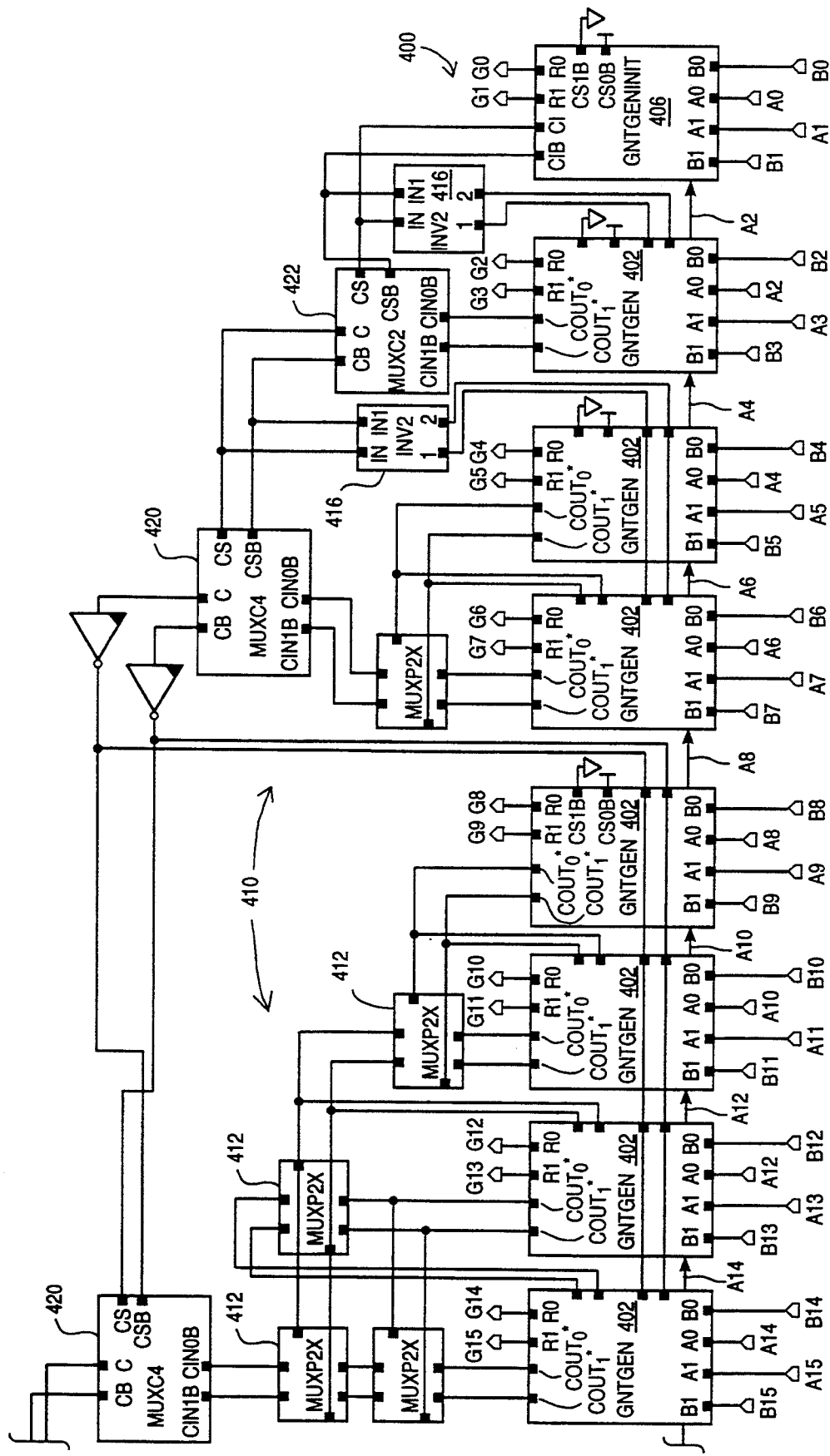
FIG.—12B
→FIG.—12A

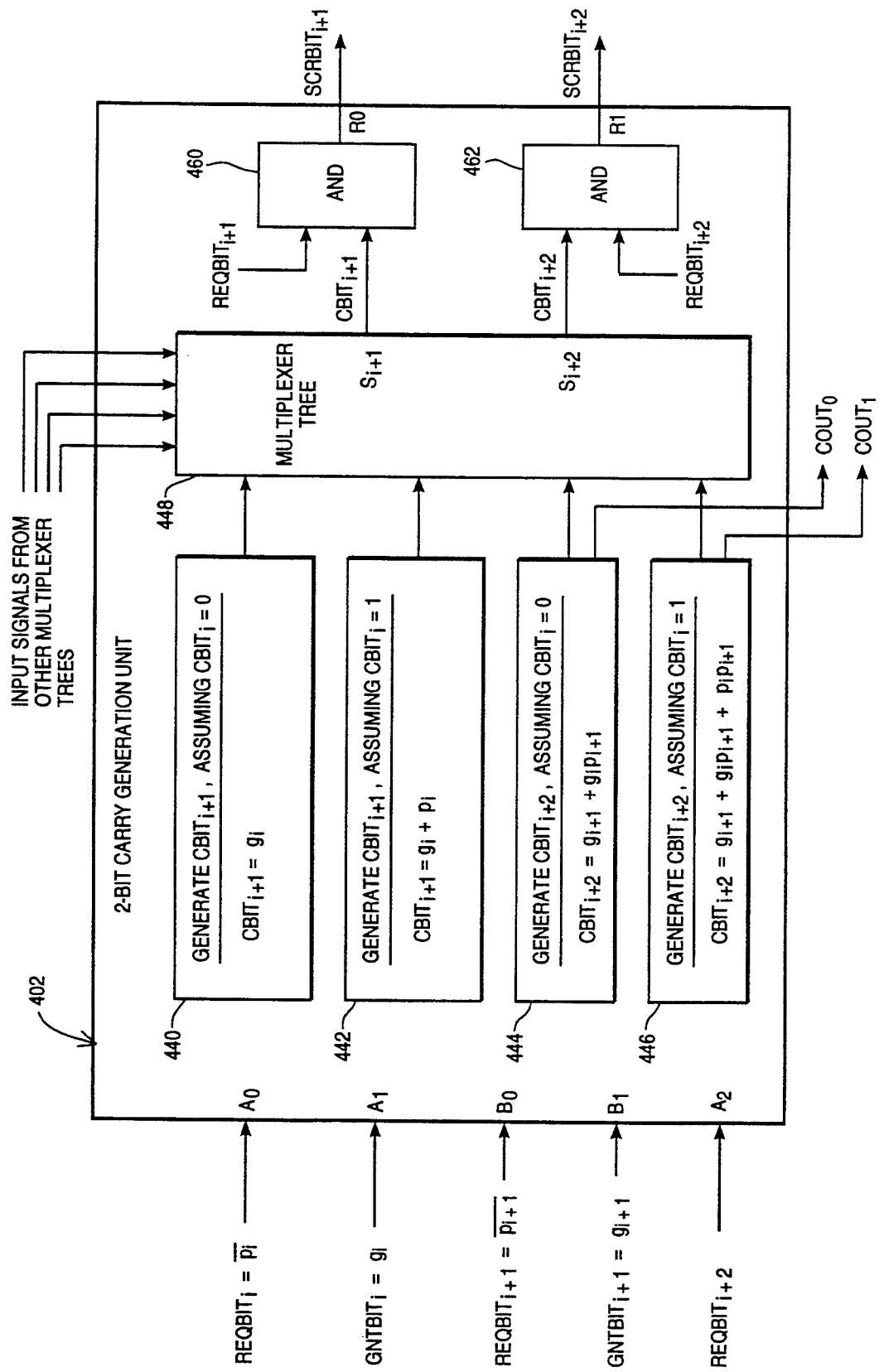
FIG_13

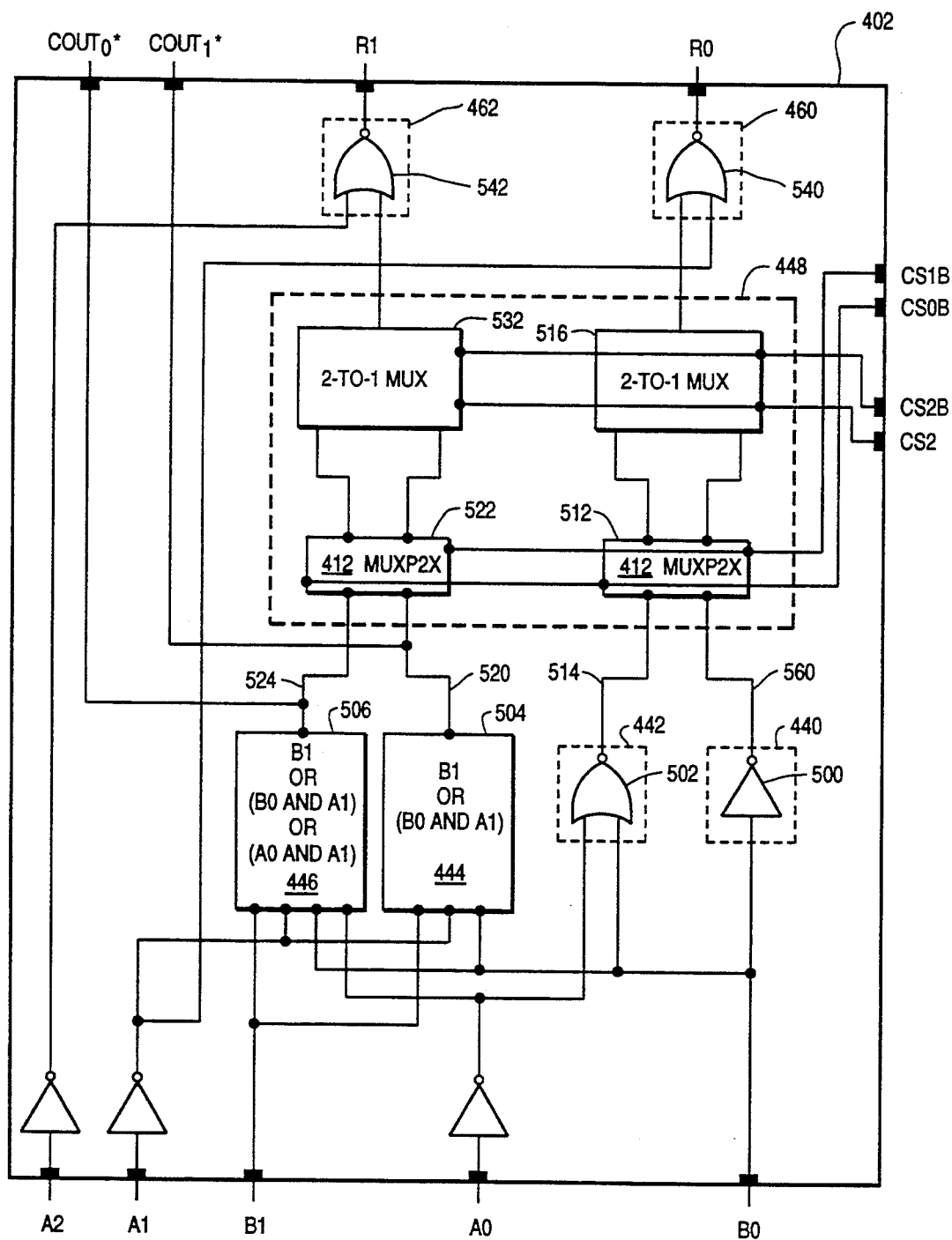
FIG_14

FIG_15
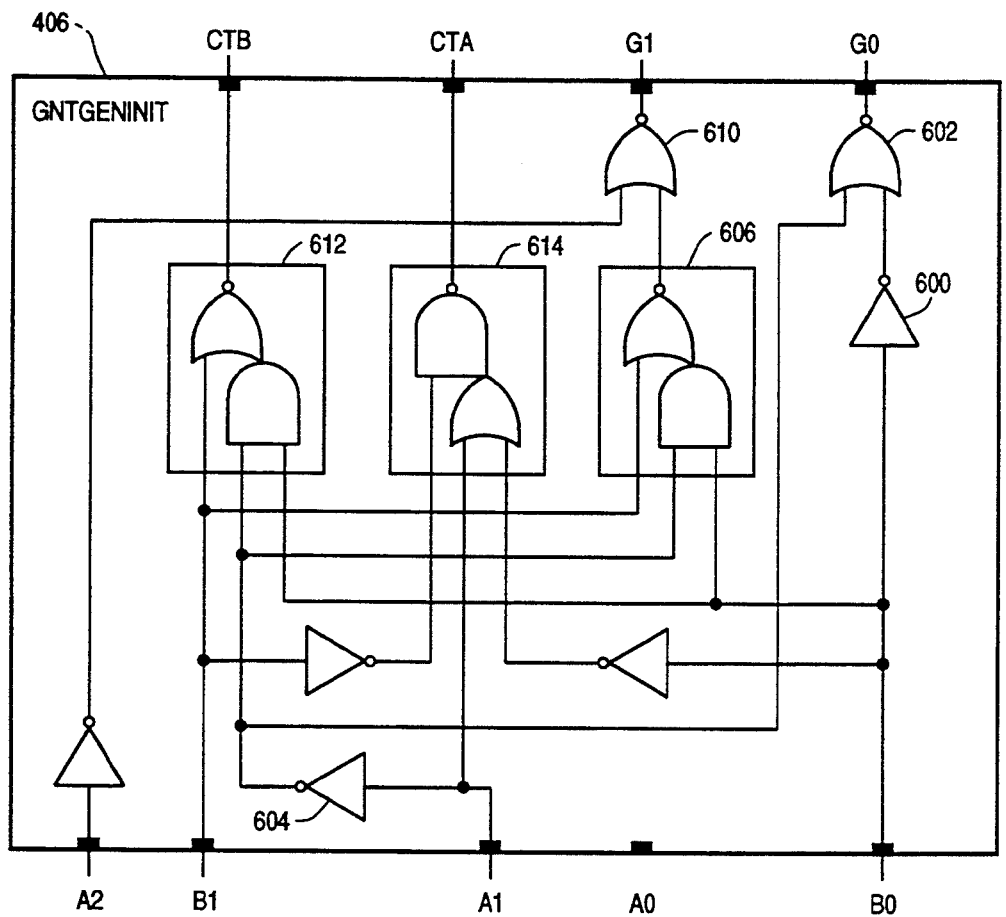
FIG_16
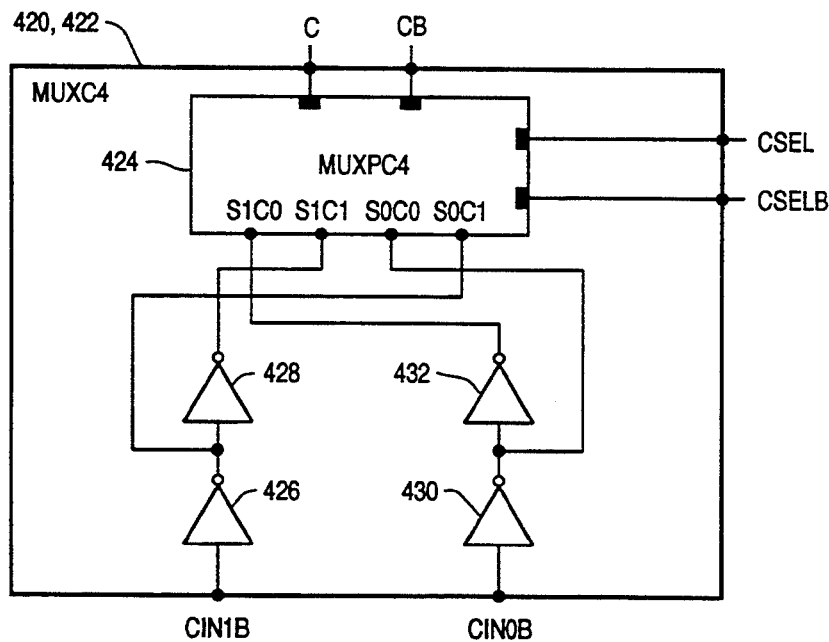

FIG_17
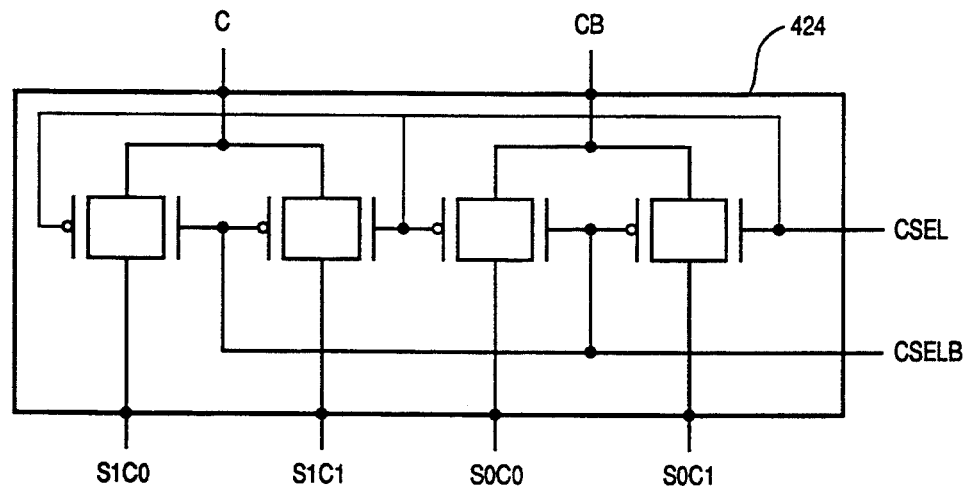
FIG_18
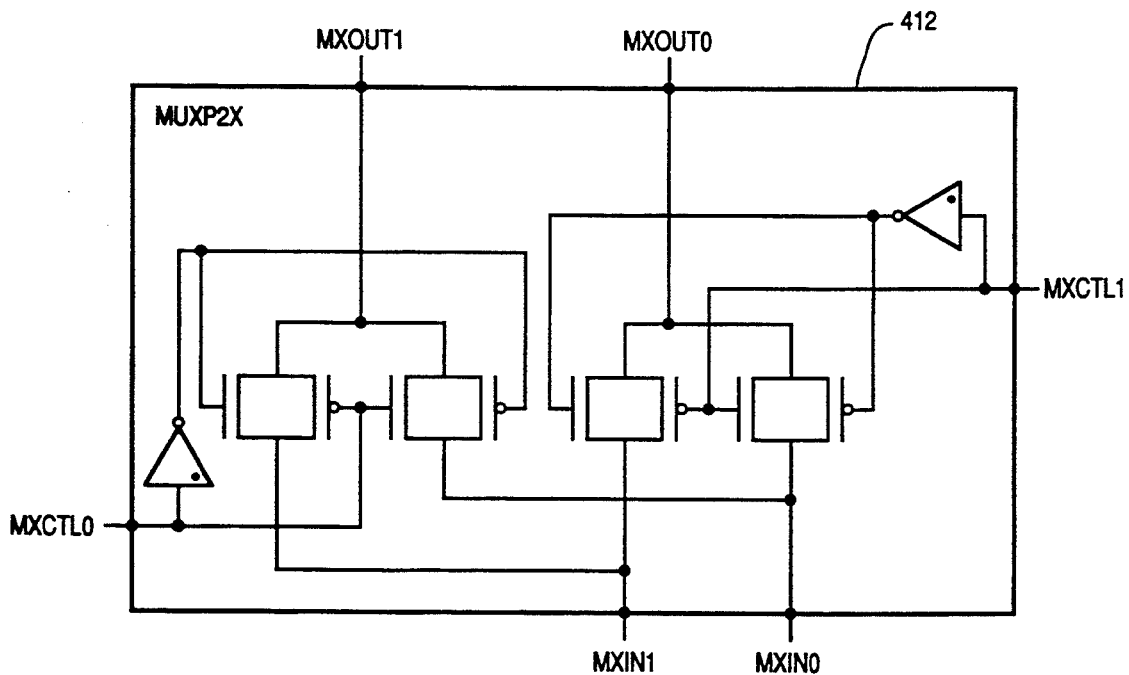

CONDITIONAL CARRY SCHEDULER FOR ROUND ROBIN SCHEDULING

CROSS-REFERENCE TO RELATED APPLICATIONS

The present application is related to a commonly assigned application entitled A METHOD AND APPARATUS FOR ROUND ROBIN SCHEDULING, by MANPREET S. KHAIRA, U.S. patent application Ser. No. 07/998,555, filed the same date herewith.

BACKGROUND OF THE INVENTION

1. Field of the Invention

The present invention relates to schedulers for shared communication links. More specifically, the present invention relates to round robin scheduling of a plurality of clients using a shared resource.

2. Description of Related Art

A scheduler is a basic building block for communication systems that have many users ("clients"), and a limited number of communication links ("shared resources"). For many systems, a scheduler allows multiple clients to share a single data communication resource. The scheduler allocates use of the bus among the competing clients, and it should allocate use as fairly as possible. A client is termed the "master" while it has control of the shared resource. As one example, a bus is a shared resource for a microprocessor. The bus is shared by clients such as a CPU, memory, peripherals, I/O units, modems, etc. and the client who has control of the bus is the master. As another example, communication links between multiple processors are shared resources and the processors themselves are the clients. There may also be multiple communication links that can be treated as clients. Particularly for massively parallel computing, a channel in one of the buses can be treated as a shared resource, and requires scheduling according to the same principles as a single bus.

A number of schemes have been proposed for allocating use of a shared resource. One currently popular scheme is the round robin bus scheduler, which is based on the token ring concept. Conceptually, there are m clients with ordered identities and the clients are offered service one at a time in a predetermined round robin order. A client that requests service therefore waits until it is offered service before beginning transmission. Then, that client becomes the master and begins transmitting. When that client is finished transmitting, the next client in the ring is offered service. If the next client has requested service, then it begins transmitting, otherwise the offer of service moves on to the next client in the ring. Thus, each client in the ring is offered service dependent upon its order in the ring. When the last client is reached, the offer of service loops around to the first client, and then continues from client to client in the predetermined order, looping around each time that it reaches the end.

A round robin scheduler can also be described mathematically. A round robin scheduler has N clients. Let the client that got the resource in the last scheduling cycle be i ($1 < i < N$). The round robin scheduler will find the very first client between $i+1$ and N that is requesting the resource. If no client in that range is making a request then the scheduler will grant the resource to the first requesting client between 1 and i.

The round robin scheduler has many variations. One of these variations adds the concept of priority to the scheduling decision. For example, several of the clients may have a greater need for the shared resource. In that instance, service may first be offered to those clients having the higher priority before the offer is made to those having a lower priority. An example of such a circuit is disclosed in U.S. Pat. No. 4,375,639, *Synchronous Bus Arbiter*, issued Mar. 1, 1983 to Johnson, Jr.

Schedulers have been implemented in circuits and software. The amount of time consumed in determining which client will next be granted the shared resource ("the scheduling cycle") is important for some uses such as high speed switching. Schedulers implemented in software generally have a scheduling cycle that is too long for high speed switching of communication lines. Faster scheduling can be accomplished using electrical circuits, and therefore high speed schedulers are generally implemented with electrical circuits.

A scheduler circuit can be implemented with a centralized circuit that receives requests for service and grants a request according to its implemented algorithm. For greater performance in a centrally controlled round robin scheduler, the scheduling cycle can be hidden behind the data communication period. In other words, while the scheduler is performing the scheduling cycle, data is being transmitted according to the grant of the previous scheduling cycle. To obtain maximum benefit from "hiding" the scheduling cycle, the data communication period should be at least as long as the scheduling period. This minimum data communication period may require a larger packet size than would be otherwise desirable for high speed communications.

It would be an advantage to provide a scheduler that has a very short cycle for scheduling access to a shared resource. Such a scheduler could improve the overall performance of any communication system that schedules use of a limited resource among a plurality of clients. Such a scheduler would have particular application for improving the performance of computer data communication within a processor, between a processor and its peripherals, and between multiple processors. It would be a further advantage if the scheduler could be implemented with a simple circuit, and could schedule a large number of clients. Such a scheduler circuit could be manufactured with minimal space requirements on a computer chip at low cost.

SUMMARY OF THE INVENTION

The present invention provides a fast, reliable scheduler for scheduling communication by a plurality of clients who compete to use a shared resource. The scheduler includes a scheduler carry generation unit that performs a novel scheduler carry function useful for quickly and efficiently scheduling clients. The scheduler carry function resembles an addition operation in which only the carry results are useful. The scheduler can be implemented on a computer chip using proven technology, and it is area efficient. Furthermore, it is fast, which allows high switching rates and greater performance.

A scheduler, in accordance with principles of the invention, performs a scheduling cycle to schedule use of a shared resource to one of a plurality of clients in a predetermined order. Each client supplies a request bit that is asserted to request use of the shared resource. Each client also has an input for receiving a grant bit from the scheduler and circuitry responsive to an asserted grant bit for using the shared resource during a subsequent communication cycle. The scheduler carry unit includes an inverter coupled to receive the request bits from said clients with said predetermined order and to output request bits having said predetermined order. The scheduler also includes a scheduler carry (SC) generation unit coupled to receive the grant bits selected in the previous scheduling cycle and the request bits. The SC generation unit generates a plurality of carry bits with a predetermined order, the carry bits including an asserted bit at the position in said predetermined order corresponding to a client who will be granted use of the shared resource. The carry bits and request bits are supplied to a plurality of AND gates arranged in the predetermined order. The AND gates have inputs for receiving the carry bits and the request bits. Each AND gate has an input for receiving a carry bit and a request bit at the same bit position in the predetermined order, and each AND gate outputs a SC result bit at that bit position.

The SC generation unit performs a novel operation, however, it is only a part of a round robin scheduler. The SC generation unit provides a SC result word based upon a selection of a carryin bit. The carryin bit is initially assumed to be zero, and the SC generation unit performs an initial operation. A carryout bit is calculated, and if it is zero, then the SC result bits for the initial operation provide the grant word for the current scheduling cycle. However, if the carryout bit is one, the SC generation unit performs a second operation in which the carryin bit is assumed to be one. The SC result bits from this second operation provide the grant word for the current scheduling cycle.

To increase speed of operation, the initial and the second operations can proceed in parallel branches, and the result chosen when the carryout bit is known. Furthermore, the second operation can be implemented with a hifind operation that is less costly to implement.

The round robin scheduler can be implemented with a novel conditional carry scheduler. The request bits and grant bits are paired by client, arranged in a predetermined order of bit positions, and applied to a plurality of two-bit carry generation units. Each two-bit carry generation unit receives a first bit pair including a first request bit and a first grant bit from a first bit position and a second bit pair including a second request bit and a second grant bit from a second bit position. The first and second pairs are adjacent in the predetermined order. Each two-bit carry generation unit includes means for calculating a $COLT_0$ signal indicative of a first conditional carryout bit from the second pair assuming the carryin bit to the first pair is zero and a $COUT_1$ signal indicative of a second conditional carryout bit from the second pair assuming the carryin bit to the first pair is one. The conditional carry scheduler includes a multiplexer tree coupled to receive the $COUT_0$ and $COUT_1$ signals from each of the plurality of two-bit carry generation units and, responsive to said $COLT_0$ and $COUT_1$ signals, selects one of said $COLT_0$ and $COUT_1$ signals to define a carry input to each two-bit carry generation unit. Each two-bit carry generation units further includes a first pair carry generation means for computing a first carry bit from the first pair and a first AND gate having inputs for receiving the first carry bit and the second request bit and outputting a SC result bit for the second bit position. Each two-bit carry generation units also includes a second pair carry generation means for computing a second carry bit from the second pair and a second carry bit from the second pair and a second AND gate having inputs for receiving the second carry bit and a third request bit at a third bit position adjacent to the second position, and outputting a SC result bit for the third bit position.

Priority between clients can be implemented by allowing predetermined clients with priority to disable the scheduler. When the scheduler is disabled, only the client who is using the resource will continue to use it. Thus, high priority units can simply disable the scheduler when it gets the resource. Different levels of priority can be implemented by logic that resolves competing requests to disable by allowing only the client with the highest priority to disable the scheduler.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a block diagram illustrating the relationship between a shared resource, a plurality of clients, and the scheduler.

FIG. 2 is a block diagram of the scheduler.

FIG. 3 is a diagram illustrating operation of the scheduler carry (SC) function.

FIG. 4 is a flow chart illustrating the scheduler carry (SC) function implemented using conventional carry addition.

FIG. 5 is a flow chart illustrating a SC function in terms useful for the preferred embodiment.

FIG. 6 is a flowchart illustrating a hifind operation.

FIG. 7 is a flowchart of operation of a scheduling cycle in which the SC operation and the biffrid operation are performed in parallel.

FIG. 8 is a flow chart of communication operations including a communication cycle and a scheduling cycle.

FIG. 9 is a timing diagram of seven clock cycles illustrating exemplary scheduling cycles, communication cycles, and request signals for a simplified scheduler with four clients.

FIGS. 10A–10F illustrate operation of scheduling cycles for the timing diagram of FIG. 9.

FIG. 11 is a flowchart of an alternative embodiment of a scheduler that performs SC operations serially rather than in parallel.

FIGS. 12A and 12B are circuit diagrams of a conditional carry scheduling unit that has no more than thirty-two clients.

FIG. 13 is a block diagram of circuits within a two-bit carry generation circuit in the conditional carry scheduling unit.

FIG. 14 is a circuit diagram of a carry generation unit (GNTGEN) from FIGS. 12A and 12B.

FIG. 15 is a circuit diagram of an initial carry generation unit (GNTGEN-INIT) from FIG. 12B.

FIG. 16 is a diagram of a fast multiplexer (MUXC4) from FIG. 12B.

FIG. 17 is a circuit diagram of MUXPC4 from FIG. 16.

FIG. 18 is a circuit diagram of MUXP2X from FIGS. 12A, 12B, and 14.

DETAILED DESCRIPTION OF THE PREFERRED EMBODIMENT

FIGS. 1 through 18 of the drawings disclose various embodiments of the present invention for purposes of illustration only. One skilled in the art will readily recognize from the following discussion that alternative embodiments of the structures and methods illustrated herein may be employed without departing from the principles of the invention.

FIG. 1 is a block diagram that illustrates a shared resource 10 that is used by a plurality of clients 12, including $client_1$, $client_2$, $client_3$, ..., $client_N$. Each client 12 is connected to the shared resource 10 through a conventional bus interface 14, which is utilized by a client 12 only when that client 12 has been selected and notified that it can use the bus. If the client 12 has not been notified that it has a right to use the shared resource 10, then the client 12 will wait until it receives notice. A client can be any device that wishes to transmit a message. The shared resource can be any communication channel, for example a single channel bus, or one of the channels of a multiplexed communication system. Time division multiplexing (TDM) is one method for supplying a number of channels on a single communication link.

Each client 12, when it wants to transmit a message, utilizes a request bit (REQBIT) on lines 16. To make a request, the requesting client asserts his REQBIT. For example, if $client_1$ and $client_2$ were to request use of the shared resource, then $client_1$ asserts $REQBIT_1$, and $client_2$ asserts $REQBIT_2$. A scheduler 18 receives the REQBITs on the lines 16 in a request word latch 20. A clock signal clocks the REQBITs into the latch 20 before the beginning of a scheduling cycle. The output of the request word latch 20 is a request word with the REQBITs arranged in a predetermined order. The request word is supplied to an SCO branch 22 and a hifind branch 24. The SCO branch 22 includes a novel scheduler carry (SC) generation unit to be discussed in further detail, especially with reference to FIGS. 2, 3, 4 and 5. As will be described, the SC generation unit could also be used to implement the hifind operation that is performed in the hifind branch 24. However, in the preferred embodiment the hifind branch 24 implements the hifind operation with a conventional combinational logic circuit that is simpler and less expensive. A selector 26 chooses between the results of the SCO branch 22 and the hifind branch 24, based upon a carry out bit calculated in the SCO branch 22 to select a grant word. The selected grant word is supplied to a grant word latch 30, which clocks in the selected grant word before the beginning of a next communication cycle in which the grant word will determine which of the clients 12 can use the shared resource 10. The grant word latch 30 supplies grant bits to each of the clients 12 on a plurality of lines 32. The grant bits on the line 32 include the $GNTBIT_1$, $GNTBIT_2$, $GNTBIT_3$, ..., and $GNTBIT_N$. Each of the GNTBITs are either asserted ("1") or not asserted ("0"), to indicate to each of the clients 12 whether or not that client has use of the shared resource 10. Only one of the GNTBITs can be asserted at any one time in order to allow only one client 12 to utilize the shared resource 10.

The scheduler 18 may also receive disable signals on lines 34 from one or more clients. The scheduler 18 includes a scheduler disabling circuit 36 to respond to the disable signal by disabling operation so that no further scheduling cycles will be performed while the disable signal is asserted. The absence of a scheduling cycle allows the client who currently has control of the shared resource to remain in control, thereby asserting priority over the other clients. The scheduler disabling circuit 36 may include conventional logic for allowing one client to assert a higher priority over the other. Disabling the scheduler 18 is also discussed with reference to FIG. 8. The scheduler 18 also includes control circuitry 38 that controls various functions such as timing, etc.

Reference is now made to FIG. 2, which is a block diagram of the scheduler 18. As described previously, the request word latch 20 supplies a request word to the SCO branch 22 and the biffrid branch 24. The SCO branch 22 includes an inverter 40 that inverts all bits of the request word and outputs a $\overline{\text{request}}$ word. The $\overline{\text{request}}$ word is applied to a novel scheduler carry (SC) generation unit 42 which operates in a manner to be described subsequently in detail to calculate a carry word and carry out bit. The carry word is supplied to an AND unit 44. The other input to the AND unit 44 is the request word. The output of the AND unit 44 is the SC result word which is applied to a multiplexer 46.

In the hifind branch 24, the request word is applied to a hifind unit 48 which operates to set all bits to zero except the first asserted bit in the predetermined bit order. The output is a biffrid result word that has only one asserted bit. The hifind result word is applied to the multiplexer 46 which selects either the SC result word or the biffrid result word using a carry out bit on a line 49 from the scheduler carry generation unit 42. If the carry out bit is "0", then the SC result word from the SCO branch 22 is selected to be the next grant word. However, if the carryout bit is "1", then the hifind result word is selected. The grant word is supplied on output 50 from the MUX 46 and applied to the grant word latch 30 where it is clocked out to the lines 32 before the next communication cycle so that this information is available to the clients 12 when the next communication cycle begins.

FIG. 3 is a diagram that illustrates the SC scheduler carry (SC) function operating on the request word and the grant word in the SC generation unit 42 (FIG. 2). For purposes of illustration, the request word and the grant word in FIG. 3 include four bits, indicating four clients. However, the principles of the SC operation can apply to any number of clients. Thus, if there are N clients, then there will be N bits in the request word and the grant word. In the preferred embodiment, N=32, therefore the request word and the grant word will each have thirty-two bits.

An operation 53 illustrates that a $\overline{\text{request}}$ word* is calculated by a "OR" operation, on the bit level, between the $\overline{\text{request}}$ word and the grant word. The carry word to be calculated is illustrated along a top line 54 of FIG. 3. The first bit in the carry word (CBIT1) is a "carryin bit". The carryin bit 55 may be assumed to have a value of "0" or "1", depending upon the specific implementation. In the SCO branch 22, a carryin bit of "0" is assumed. The biffrid branch 24 performs an equivalent function to the SCO branch 22 if a carryin of "1" is assumed. This assumption simplifies the SC function so that it can be implemented more easily and straightforwardly with the hifind function to be described with reference to FIG. 6.

Another way of implementing the scheduler 18 would be to have only one branch instead of two. In this alternate implementation, described later in more detail with reference to FIG. 11, a value of "0" is assumed for a first SC operation. If the carryout bit from the first SC operation turns out to be "0", then the carry word calculated in the first SC operation is correct. However, if the carryout bit from the first SC operation is "1", then a second SC operation is performed assuming a carryin bit of "1" to obtain the correct carry word. However, because serial operation is too slow for the preferred embodiment, the first and second SC operations are performed in parallel, and then the correct word is selected when the carryout bit from the first SC operation is known.

Referring still to FIG. 3, a $\overline{\text{request word}^*}$ calculated in the line 53 is supplied to a line 56 and a current grant word is on a line 58. The current grant word is the word that was calculated in the previous scheduling cycle, and is currently being used to determine who has use of the shared resource. Obtaining these words has been previously described with reference to FIGS. 1 and 2. The bits $CBIT_1$ from the carry word, $\overline{REQBIT_1}^*$ from the request word* and GNTBIT from the current grant word, are "added" together, and the resultant carry bit becomes $CBIT_2$. The actual sum from that "addition" is unimportant and not used. Next, the bits $CBIT_2$, $\overline{REQ BIT_2}^*$, and $GNTBIT_2$ are "added", and the carry bit from that operation becomes $CBIT_3$. Operation proceeds accordingly for each of the remaining bits. The fourth "add" operation is the last of four operations in this example. The carry bit from the fourth "add" operation thus becomes the carryout bit. The carryout bit may also be termed "$CBIT_{N+1}$" elsewhere herein. An example of the SC function applied in the scheduler 18 is discussed later with reference to FIGS. 8 and 9.

FIG. 4 is a flow chart illustrating operation of the SC operation that occurs in the scheduler carry generation unit 42 of FIG. 2. As will be apparent, the scheduler carry generation unit 42 is somewhat like an addition, except that only the generated carry bits are useful. The resultant carries supply $CBIT_2$ through $CBIT_N$ and the carryout bit. Beginning in a box 60, the SC operation is started to Calculate the bits of the carry word: $CBIT_1$, ... $CBIT_N$, and a carryout bit. In a box 61, the request word and the grant word are "OR"ed together at the bit level. Because only one bit in the grant word is "1", the "OR" operation forces the corresponding bit in the request word* to be "1", therefore ensuring a carry will be generated from that bit location. This forcing of a carry is useful for illustrative purposes to describe the SC function for general application. However, the preferred embodiment to be described with reference to FIGS. 5, 10, and 12–18, implements the SC function and forces a carry without requiring a specific forcing step.

Next, in a box 62 a carryin value is obtained of either "0" or "1". Next, in a box 64 the first bit of the carry word ($CBIT_1$) is set to equal the carryin value obtained in the previous box 62. Then in a box 66, i, the index, is set equal to "1". In a box 68, a carry bit operation is performed for the $i^{th}$ bits in the request word* and the grant word, using the carry bit result from the carry bit operation on the previous bit. In a carry bit operation, carry bits are generated, as if the $i^{th}$ bits of the request word* and the grant word are being summed, but only the carry information is used and supplied to the next bit "addition".

Next, in a decision 70, it is determined whether the index i is equal to N, the largest number of clients. If not equal, then operation moves to the decision 72 which branches based upon whether or not the operation in the box 68 resulted in a carry equal to "1". If the carry was "1", then operation continues in a box 74 in which the $CBIT_{i+1}$ is set equal to "1". If there is no carry (i.e., the carry equals "0"), then operation moves to the box 76 in which "0" is set to be the value of $CBIT_{i+1}$. Next, operation moves to the box 78 in which index i is incremented and operation then loops back to repeat the box 68 for each of the N bits. When the index i equals N in the box 70, then operation moves to the decision 80. If the carry equaled "1" in the operation 68, then the carryout bit is set equal to "1", as illustrated in a box 82. However if there was no carry in the box 68, then operation moves to the box 84 in which the carryout bit is set equal to "0". Then, the SC operation is complete, as illustrated in a box 86.

Reference is now made to FIG. 5 which is a flow chart that, like FIG. 4, performs the SC operation occurring in the box 42 of FIG. 2. Box 100 illustrates beginning the scheduler carry (SC) operation to calculate the carry word and the carryout bit. The carry word will have N bits: $CBIT_1$, ... , $CBIT_N$. In a box 101, a carryin bit is obtained, and the $CBIT_1$ assumed to be equal to the carryin bit. Operation then moves to a box 102 in which the index i is set equal to "0". Next, operation moves to a box 104 in which the index is incremented by 1. Then, in decision 106, if the index i is less than N, then operation continues to a decision box 108. If the $GNTBIT_i$ equals "1", then operation moves to a box 110 in which the $CBIT_{i+1}$ is set equal to "1", and operation loops back following the box 102 and before the box 104. However, if $GNTBIT_i$ does not equal "1" in the decision 108, then operation moves to the decision 112. If the $CBIT_i$ equals "1" and the $\overline{REQ BIT_i}$ is also equal to "1", then operation moves from the box 112 to the box 110 in which the $CBIT_{i+1}$ is set equal to "1", and operation loops back before the box 104. However, from the box 112 if the $CBIT_{i+1}$ is not equal to "1", or the $\overline{REQBIT}$ bit is not equal to "1", then the $CBIT_{i+1}$ is set equal to "0" and operation returns to before the box 104. The loop continues for each of the N bits of the carry word and the carryout bit ($CBIT_{N+i}$ is the carryout bit), and the loop is exited from the box 106, in which if the index i is greater than N, then the SC operation is complete as illustrated in the box 116.

Reference is made to FIG. 6 which is a flow chart of the hifind operation. The hifind function produces a result that is the same as the result that would be produced if the SCO branch 22 were modified to assume a carryin of "1". As will be seen, the hifind function is substantially simpler. Operation begins in a box 120 to calculate the N bits of the hifind result word: $HIFBIT_1$, $HIFBIT_2$, ... $HIFBIT_N$. In the box 122 the index i is set equal to "1". Then a decision is made based on the value of i. If the index i is less than or equal to N then operation moves to a decision 126. If the index i is greater than N, then operation moves to the box 127, in which the hifind operation is complete. In the decision 126, if the $i^{th}$ bit of the request word ($REQBIT_i$) does not equal "1" then operation moves to the box 128 in which $HIFBIT_i$ is set equal to "0". Operation then moves to a box 130 in which the index is incremented. Operation then leaves the box 130 and returns to the decision 124, and the loop continues until the ith bit in the request word ($REQBIT_i$) equals "1". Then operation exits from the loop in the decision 126 and moves to a box 132 in which $HIFBIT_i$ bit is set equal to "1". Then the index i is incremented as illustrated in a box 134, and operation moves to the decision 136. If the index i is less than N, then operation moves to the box 138 in which HIFI31T$_i$ is set to "0" and operation loops back to the box 134. The loop continues through boxes 134, 136, 138 until all of the remaining bits in the hifind result word have been set equal to "0" and i is greater than N. Then operation exits at a box 140.

Reference is now made to FIG. 7 which illustrates a scheduling cycle for a communication scheduler having parallel branches for faster scheduling operation. Beginning in a box 200, the scheduling cycle is started. Box 202 illustrates that the grant information for the current scheduling cycle is known and the grant bits from that current scheduling cycle define the grant word. Next in a box 204, the request bits from each client are latched into the request word latch, and these request bits define a request word. Next, operation proceeds in parallel to two branches: a hifind branch including the box 206, and a SC operation branch illustrated by the boxes 208, 210, and 212. In the box 206, the hifind operation is performed on the request word to provide the hifind result word in accordance with FIG. 6. In the box 208 in the SCO operation branch, the request word is inverted and then, in the box 210, a scheduler carry operation is performed on the request word and the grant word, assuming a carryin of "0". Next in a box 212, an AND operation is performed on the results of the SC operation and the request word to provide an SC result word. Next, operation from both of the branches moves to the decision 214, in which the carry out from the box 210 scheduler carry operation is tested. If the carry out equals "1", then the box 218 illustrates that the SC result word is chosen to be the next grant word. However, if the carry out from the SC operation is "0", then operation moves to the box 216 in which the hifind result word is chosen to be the next grant word. Operation moves from the boxes 216 and 218 to end the scheduling cycle in the box 220. Thus, the scheduling cycle is complete. Typically, a scheduling cycle will be performed each communication cycle, to schedule client requests in a round robin order.

Reference is now made to FIG. 8 which illustrates a communication operation including the scheduling cycle and a communication cycle. Beginning in the box 240, the communication operation is started. Initial grant bits and request bits are assumed. Preferably, the initial grant bits are all "0", except for the last bit, GNTBIT$_N$, which is initialized at "1". This ensures that the first client in the predetermined order will have first use of the shared resource. The initial request bits are all "0" until one client requests use of the resource. From the start 240, operation moves in parallel to two branches: a communication branch, and a scheduling cycle branch. The communication branch includes the box 242 in which the respective grant bit is supplied to each client. Next, in the box 244, the communication cycle is begun so that the client specified by the grant bits begins using the shared resource. As has been described previously, the grant word will specify only one client that will be entitled to use a single shared resource.

In the scheduling cycle branch, a box 246 illustrates that the request bits are latched into latch 20 to supply the request word. Next, the scheduling cycle is performed, (see FIG. 7) to calculate the grant bits for the next communication cycle. Following completion of the scheduling cycle, a box 250 illustrates that the grant bits are latched into latch 30.

Operation from the communication cycle branch and the scheduling cycle branch then moves to the decision 252. Therein, if the communication cycle is not complete, then operation simply waits as illustrated in the box 254 until it is complete. Following completion, operation moves to a box 256 which illustrates that the next communication operation begins. Next, a decision 258 branches dependent upon whether or not the scheduler 18 is disabled. One example for disabling a scheduler 18 is in the situation when a client that has control of the shared resource has priority to continue using that resource. In that instance, that client would disable the scheduler 18 so that only he can continue using the resource. From the decision 258, a disabled scheduler 18 would cause the loop to return only to the box 242 and 244, and to continue looping until that client no longer needs his priority or until another client asserts a higher priority. If the scheduler 18 is not disabled, then operation loops back to repeat each of the branches including the communication cycle branch and the scheduling cycle branch. A scheduling cycle will then be performed for each communication cycle. In an operating communication system, many communication and scheduling cycles will be performed every second. Typically the length of the communication cycle will be longer than the scheduling cycle, so that the scheduling time is "hidden" behind the communication time. Tests have illustrated that the scheduling cycle of the preferred embodiment is 4.1 ns. Therefore, a communication cycle should require at least 4.1 ns.

The scheduling cycle will operate properly only if one grant bit is asserted; i.e., the grant word cannot be permitted to have all zeros. In the preferred embodiment, if no clients are requesting use of the resource, then the grant word is maintained with a bit asserted at the position of the last client that had use of the resource. Conventional logic is employed to maintain the grant word unchanged whenever this situation occurs. In other embodiments the grant word may be forced to a predetermined value, for example the last bit of the grant word may be asserted, whenever no clients are requesting to use the resource.

Reference is now made to FIG. 9 which is an exemplary series of communication operations for four clients. For seven clock cycles, FIG. 9 illustrates exemplary REQBITs and grant bits. Reference is also made to FIGS. 10A through 10F which illustrate calculations performed in the scheduler to schedule the client for each of the seven clock cycles. Beginning in a first clock cycle 281, client$_1$ and client$_4$ are requesting use of the shared resource. During this time, client$_1$ has had use of the shared resource. A scheduling cycle is performed to determine which of the clients will have use of the shared resource during a second clock cycle 282. The calculations to determine this are diagrammed in FIG. 10A. Only relevant calculations are shown. The operations shown in FIGS. 10A through 10F correspond to the operations illustrated in the flow chart of FIG. 7. Particularly, the scheduler carry operation 210, for purposes of illustration herein, includes a bit forcing operation in which the request word is "OR"ed with the current grant word. This provides an request word* which is then used in the carry bit generation operation together with the grant word to calculate a carry word. The carry word is calculated in the top line of the carry bit generation operation of FIG. 10A. The carryin bit for the operations in FIGS. 10A–10F is assumed to be "0" as required for the scheduler carry operation 210.

Following calculation of the carry word, the next step is to perform either operation 212 or the hifind operation 206, depending upon the results of the carry-out bit from the carry bit generation operation. If the carry out bit is "0", then the biffrid operation 206 is not pertinent, and only the AND operation 212 will be illustrated. However, if the carry out bit is "1", then the "AND" operation 212 is not pertinent because the hifind operation 206 will provide the proper grant word, and therefore only the hifind operation 212 will be illustrated.

Reference is now made to FIG. 10A which illustrates operation of the scheduling cycle during the first clock cycle 281 in which client$_1$ and client$_4$ are requesting use of the shared resource and client$_2$ and client$_3$ are not. Therefore the request word is "1001" and the request word is "0110". Client 1 is using the shared resource, therefore the current grant word is "1000". Beginning with the bit forcing operation, the request word and the current grant word are "OR"ed to provide a request word* of "1110". The request word* is supplied to the carry bit generation operation. In the carry bit generation operation, calculation proceeds from bit to bit in accordance with the description of FIG. 3. Particularly, the carryin bit (CBIT$_1$) is assumed to be "0", REQBIT$_1$* is "1", and GNTBIT$_1$ is also "1". Therefore, the first bit carry is "1" which yields CBIT$_2$ of the carry word. The carry from the second bit is also "1" which yields CBIT$_3$ of the carry word. The carry bit generation from the third bit yields a CBIT$_4$ of "1". The carry bit generation from the fourth bit yields a carryout bit of "0". Therefore, the AND operation 212 is useful to determine the new grant word. The carry word is "AND"ed with the request word to provide a new grant word of "0001", indicating that client 4 will use a shared resource in the next cycle.

Reference is now made to FIG. 10B which illustrates the scheduling cycle in which the hifind result word, rather than the SC result word, is selected to yield the new grant word. The bit forcing operation supplies a request word* of "0111". Again, a bit-by-bit carry generation operation yields a carryout bit of "1". Therefore, the AND operation 212 will not provide a result that is used, and instead, the hifind operation 206 will provide the new grant word. The hifind operation 206 is straightforward to illustrate in example form, because the first asserted bit of the request word becomes the first asserted bit of the hifind result word. All other bits are set to "0". Thus, the hifind result word is "1000", and therefore in the third clock cycle 283, the first client will use the shared resource.

Reference is briefly made to FIGS. 10C, 10D, 10E and 10F. FIG. 10C illustrates a scheduling cycle when client$_1$, client$_2$, and client$_4$ are requesting use of the shared resource, while client$_1$ has use of that resource. FIG. 10D illustrates scheduling cycle operation during a fourth clock cycle 284 in which the first client has dropped his request and client$_2$ and client$_4$ maintain their request to use the shared resource. As a result of the scheduling cycle during the third clock cycle 283, client$_2$ has use of the bus during the fourth clock cycle 284. FIG. 10E illustrates operation during a fifth clock cycle 285 in which the client$_2$ and client$_4$ maintain their requests, but as a result of operation during the previous scheduling cycle, client$_4$ has use of the shared resource. FIG. 1 OF illustrates operation during a sixth scheduling cycle 286 in which only client$_2$ has requested use of the resource. As a result of the previous operation, however client$_2$ has already had use of the shared resource. Therefore, as a result of operation of scheduling cycle, client$_2$ maintains use of that shared resource in the next clock cycle 287.

Reference is now made to FIG. 11 which is a flow chart illustrating operation of a serial scheduling cycle in an alternative embodiment of a scheduler. In this alternative embodiment one branch takes the place of the two branches previously described to operate in parallel. The operation begins in a box 300 in which the serial scheduling cycle is started to determine a next grant word. In a box 302, the request bits are latched from each client to define a request word. In a box 304, the request word is inverted. Next, as illustrated in a box 306 a carryin of "0" is assumed. Then, in the box 308, a first scheduler carry (SC) operation is performed. Then operation moves to the decision 310, which asks whether or not the carryout bit equals "0". If the carryout bit is "0", then the first scheduler carry operation has calculated the proper carry word, and therefore that operation moves to the box 312 in which the carry word is "AND"ed with the request word to supply the next grant word. Then, as illustrated in a box 314 the serial scheduling cycle is complete.

However, from the decision 310, if the carryout bit is not equal to "1", then operation moves to the box 320 which illustrates that a carryin of "1" is assumed. Next, in a box 322, a second SC operation is performed, using the assumption that the carryin bit is "1". The results of the second SC operation are applied to the box 312 in which the carry word is "AND"ed with the request word to supply the next grant word, and then operation moves to the box 314 which illustrates that the serial scheduling cycle is complete.

Conditional Carry Generation Unit

The above description describes a carry generation operation that, in some ways, is similar to an addition operation in which carry generation is utilized. The above-described method can be implemented using any conventional carry technique for addition operations, such as ripple-carry addition, carry look-ahead, carry-skip addition, carry select addition, or condition sum addition. Although carry generation could be implemented using any of these methods, the preferred method of implementation utilizes a variation of conditional sum addition, which is based upon carry lookahead techniques. Addition techniques such as carry lookahead are conventional, and are described in detail in Section A.8, "Speeding Up Integer Addition", pages A-31 through A-39 in Hennessy and Patterson, *Computer Architecture: A Quantitative Approach*, Morgan Kaufman Publishers, Inc., 1990. The principles of ripple-carry addition are based upon the realization that a carry can be defined by a logic equation:

$$c_{i+1} = a_i b_i + a_i c_i + b_i c_i \qquad (1)$$

The inputs "a" and "b" represent the two binary operands: "$a_i$" represents a first operand and "$b_i$" represents a second operand. The input "$c_i$" is the "carryin" bit and $c_{i+1}$ is the "carryout" bit. One problem encountered in building an adder is deciding how to propagate the carries. The simplest way to propagate carries is with the ripple-carry adder, in which the carry is propagated successively from the low order bits through each of the higher order bits. However, the ripple-carry adder is slow because each adder cannot calculate its carry bit until the preceding adders have all calculated their carry bits. In order to increase the speed of the addition process, other techniques have been used.

The carry look-ahead technique is one method of increasing the speed of integer addition. This technique can be understood in terms of a variable "$g_i$" that represents a generated carry from the bit position i, and a variable "$p_i$" that represents a propagated carry from the bit position i. For the carry look-ahead technique, these variables are defined by the following equations:

$$g_i = a_i b_i, \text{ and} \qquad (2)$$

$$p_i = a_i + b_i \qquad (3)$$

The variable $g_i$ will be "1" if a carry will be generated from the bit position i. In other words, if both operands $a_i$ and $b_i$ are "1", then a carry will be generated from the bit position i. The variable $p_i$ will be "1" if a carry will be propagated through this bit position i, when the carryin bit is "1". In other words, if either of the operands $a_i$ or $b_i$ have a value of "1", then the carry will be propagated through this bit position i. If neither of the operands are "1", then the carry will not be propagated. Therefore, the equation for the carryout bit from the bit position i is as follows:

$$c_{i+1} = g_i + p_i c_i \qquad (4)$$

In a full adder that uses two-bit slices, the carry bit i+2 from two bit positions i and i+1 is calculated. In terms of two bit positions, a bit position "0" and a bit position "1", the following equations hold:

$$c_1 = g_0 + p_0 c_0, \text{ and} \qquad (5)$$

$$c_2 = g_1 + p_1 c_1 \qquad (6)$$

Substituting $c_1$ into the equation for $c_2$ we have $$c_2 = g_1 + p_1 g_0 + p_1 p_0 c_0. \qquad (7)$$

If the carryin bit ($c_0$) equals "1", then $c_2$ is defined by the following equation:

$$c_2 [\text{assuming } c_0 = 1] = 1 + g_0 p_1 + p_0 p_1 \qquad (8)$$

However, if the carryin bit ($c_0$) equals "0", then the above equation for $c_2$ is simplified by elimination of the last term:

$$c_2 [\text{assuming } c_0 = 0] = g_1 + g_0 p_1 \qquad (9)$$

One exemplary method of implementing carry lookahead is described in the Hennessy reference at the pages cited above. For the preferred embodiment, certain optimizations of the carry look-ahead algorithm permit implementation in a faster, simpler and more efficient structure as will be described. Particularly, an optimization arises from the observation that, because only one of the GNTBITs will be asserted, and because a carry is forced from this asserted bit in the scheduler carry operation in accordance with the discussion in FIG. 4, box 61, then the following equation will be true:

$$\text{generate } (g_i) = GNTBIT_i. \qquad (10)$$

The observation that a carry bit will always be generated from bit position i if $GNTBIT_i$ is asserted simplifies the carry lookahead algorithm which had defined $g_i = a_i b_i$ for addition. A further simplification to the carry lookahead algorithm occurs from the recognition that the carry will be propagated from bit position i only if $\overline{REQBIT}_i$ equals "1". This recognition follows from previous discussions, for example in FIG. 5, from the box 112, it can be seen that the value of $CBIT_{i+1}$ follows the value of $\overline{REQBIT}_i$ if CBITi equals "1". Therefore, the following equation will be true:

$$p_i = \overline{REQBIT}_i \qquad (11)$$

Applying these simplifications to the equation (8) in order to calculate carry bit $CBIT_{i+2}$ for the scheduler, if the carryin bit $CBIT_i$ equals "1", then:

$$CBIT_{i+2} [\text{assuming } c_i = 1] = GNTBIT_{i+1} + GNTBIT_i \overline{REQBIT}_{i+1} + \overline{REQBIT}_i \overline{REQBIT}_{i+1} \qquad (12)$$

This logic equation can be implemented in one complex gate and therefore requires only one logic level. This is substantially faster than the carry look-ahead technique for addition which, when the $a_i$, $b_i$, and $c_i$ terms are inserted, would require additional logic levels.

Furthermore, if the carryin bit $CBIT_i$ is "0", then the last term in the above-equation is eliminated so that:

$$CBIT_{i+2} [\text{assuming } c_i = 0] = GNTBIT_{i+1} + GNTBIT_i \overline{REQBIT}_{i+1} \qquad (13)$$

Thus, each of the above calculations for $CBIT_{i+2}$ can be performed in parallel using a single complex gate with inputs from the bit positions i and i+1. This feature greatly speeds up operation in the system to be described. The following system, with reference to FIGS. 12A, 12B, and 13 implement the simplified equations.

Reference is now made to FIGS. 12A and 12B which, when placed together, depict a circuit diagram of a conditional carry scheduler (CCS) unit. The CCS unit fully implements the SCO branch 22 illustrated in FIGS. 1 and 2. This implementation uses conditional sum addition techniques to dramatically increase speed of the scheduling cycle and thereby decrease the length of time necessary to complete a scheduling cycle. For example, in a 32-client scheduler that implements the CCS unit, the SC operation can be performed in five clock cycles.

The CCS unit in FIGS. 12A and 12B receives inputs from clients along its lower edge. These inputs include a request bit ("REQBIT") and a grant bit ("GNTBIT") for each client. These inputs are applied to a plurality of two-bit carry generation circuits 400. The REQBITs are applied to the inputs labeled "A" and the GNTBITs are applied to the inputs labeled "B". Specifically, $REQBIT_0$ is applied to A0, $GNTBIT_0$ is applied to input B0, and so forth for each of the 32 clients illustrated in FIGS. 12A and 12B. Additionally, the REQBIT for the next bit following the two-bit slice is supplied from the next carry generation circuit 400, in order to perform the "AND" operation which will be described later in more detail. SC result bits (SCRBITS) are available from the outputs labeled with R0 and R1, to supply output signals G0, G1, ..., G30 that correspond to the SCRBITs discussed earlier. $SCRBIT_{31}$ is the carry out bit.

Because thirty-two clients are illustrated in FIGS. 12A and 12B, sixteen two-bit carry generation circuits 400 are required, each processing a two-bit "slice". The two-bit carry generation circuits 400 include fourteen two-bit carry generation units 402 (those labeled "GNTGEN"), a two-bit final carry generation unit 404 (labeled "GNTGEN-FNL"), and a two-bit initial carry generation unit 406 (labeled "GNTGEN-INIT"). The principles of operation of the circuit are illustrated by reference to the fourteen two-bit carry generation units 402. The final carry generation unit 404 and the initial carry generation unit 406 are special cases which use simplified circuitry that will be described in more detail with reference to FIGS. 14 and 15.

The output of the two-bit carry generation units 402 include two conditional outputs that are calculated and provided in parallel: $COUT_0$ and $COUT_1 1$. The $COUT_0$ signal is the carry out bit from each two-bit carry generation unit 402 assuming the carryin bit is "0". The $COUT_1$ signal is the carryout bit from the two-bit carry generation unit 402 assuming the carryin bit is "1". The $COUT_0$ and $COUT_1$ outputs are inverted, which is indicated by the star (*) following the variables. Which of the two inverted signals-$COUT_0$*, or $COUT_1$*-is selected depends theoretically upon the carryin bit to the carry generation unit 402 that generated the two signals. Of course, the carryin bit depends upon the results of previous carry operations. Each carry generation unit 402 applies its two generated signals, $COUT_0$* and $COUT_1$*, to a multiplexer tree 410 having a conventional configuration that has been utilized in principle in conditional sum adders.

The multiplexer tree 410 includes multiplexers 412 (labeled MUXP2X), inverters 416 (labeled INV2), multiplexers 420 (labeled MUXC4), and multiplexers 422 (labeled MUXC2). The multiplexer tree 410 receives carryout bits CI and CIB from the initial carry generation unit 406, and it also receives conditional carryout bits $COUT_0$* and $COUT_1$* from each carry generation unit 402. In response to these conditional carryout bits, the multiplexer tree 410 determines the actual carryout bit from each of the carry bit generation units 402, and supplies it back to a particular carry bit generation unit 402. The multiplexer tree 410 supplies the actual carryout bits back to the carry generation units 402 and 404 to select a result that will be supplied from an output R0 and R1 in each carry generation unit 402, 404, to supply output signals labeled "G0, G1, . . . G30 and $SCRBIT_{31}$" as will be described later in more detail, particularly with reference to FIG. 13.

The MUXP2X multiplexers 412 and the inverters 416 are high speed devices that utilize dual input and control signals for faster performance. Reference is briefly made to FIG. 18 to illustrate a circuit diagram of MUXP2X multiplexers 412. In the particular implementation, the multiplexers 412 have dual inputs labeled MXIN1 and MXIN0 that are applied at the bottom side of the multiplexers 412 in FIG. 18 which corresponds to their orientation in the diagram of FIGS. 12A and 12B. Two multiplexer outputs, MXOUT1 and MXOUT0, are supplied from the top side. Selection is made by dual control signals MXCTL0 and MXCTL1 applied to the sides of the multiplexer 412. The control signals MCTL0 and MXCTL1 are two bits that form four combinations. A first combination passes through the input signals MXIN1 and MXIN0 to the output signals MXOUT1 and MXOUT0. A second combination reverses the outputs. A third combination selects the input MXIN0 and applies it to both outputs. A fourth combination selects the input MXIN1 and applies it to both outputs.

The MUXC4 multiplexer 420 and the MUXC2 multiplexer 422 perform the operation of a two-input two-output multiplexer with dual input, control, and output signals. The multiplexers 420 and 422 include circuits for speed improvement. Reference is made to FIG. 16 which is a circuit diagram of the multiplexers 420 and 422 and to FIG. 17 which is a circuit diagram of a 4-to-2 multiplexer 424 within each of the multiplexers 420, 422. The 4-to-2 multiplexer 424 receives four inputs, including inverted and noninverted versions of dual inputs CIN1B and CINOB. Particularly, the signal CIN1B is applied to an inverter 426 whose output is applied to input SOC1 of the 4-to-2 multiplexer 424. The output from the inverter 426 is inverted again in an inverter 428 and supplied to an input SIC1 of the 4-to-2 multiplexer 424. The signal CINOB is applied to an inverter 430 whose output is applied to an input SOC0 of the 4-to-2 multiplexer 424. The output from the inverter 430 is inverted again in an inverter 432 and supplied to an input SIC0 of the 4-to-2 multiplexer 424. The inverters 426, 428, 430, and 432 boost signal strength and thereby allow much faster switching. Reference is made to the circuit diagram of FIG. 17. The inputs SIC0, SIC1, SOC0, and SOC1 are applied to the circuit illustrated therein. The output of the 4-to-2 multiplexer 424 includes complementary control signals C and CB that are selected by complementary control signals CSEL and CSELB. Because CSEL and CSELB are complementary, only two control combinations are possible, and for purposes of discussion, selection can be considered to be dependent upon the value of the CSEL signal. If the CSEL signal equals "1", the MUXPC4 multiplexer 424 selects complementary input signals SOC1 and SIC1. But if the CSEL signal equals "0", then the MUXPC4 multiplexer 424 selects complementary input signals SOC0 and SIC0.

Reference is now made to FIG. 13, which illustrates operation within each of the two-bit carry generation units 402. The inputs into each two-bit carry generation unit 402 include $REQBIT_i$, $GNTBIT_i$, $REQBIT_{i+1}$, $GNTBIT_{i+1}$, and $REQBIT_{i+2}$. For ease of illustration, the $REQBIT_i$ equals $p_i$, the $GNTBIT_i$ equals $g_i$, and so forth. The input designations $A_0$, $A_1$, $B_0$, $B_1$, and $A_2$ shown inside the two-bit carry generation unit correspond to the inputs to each of the two-bit carry generation units 402 shown on the diagram of FIGS. 12A and 12B.

Within each two-bit carry generation unit 402, there are four blocks representing four operations that proceed in parallel. In a first carry generation block 440, the $CBIT_{i+1}$ is generated, assuming that $CBIT_i$ equals "0". In this block 440, the value of $g_i$ becomes a first conditional value of $CBIT_{i+1}$. In the second carry generation block 442, a second conditional $CBIT_{i+1}$ is generated, assuming that $CBIT_i$ equals "1". In that instance, if either $g_i$ equals "1" or $p_i$ equals "1", then $CBIT_{i+1}$ equals "1". Otherwise, $CBIT_{i+1}$ equals "0". In the third carry generation block 444, a first conditional $CBIT_{i+2}$ is generated, assuming that $CBIT_i$ equals "0" in accordance with equation (13). A fourth carry generation block 446 generates a second conditional $CBIT_{i+2}$ that assumes CBITi equals "1", in accordance with equation (12). The output of the third carry generation block 444 is the $COUT_0$ signal previously described. The output of the carry generation block 446 is the $COUT_1$ signal previously described.

The four carry generation blocks 440, 442, 444, and 446 operate in parallel, and for illustrative purposes, the outputs from these four blocks 440, 442, 444, and 446 are all available at about the same time. Their outputs are applied to a multiplexer tree 448 which is explained in more detail with reference to FIG. 14. The multiplexer tree also receives input signals from the other multiplexer trees and the multiplexer tree 410 shown in FIG. 12. Based upon these input signals, in accordance with conventional conditional sum addition techniques, the output of either the functional block 440 or 442 is applied to select $CBIT_{i+1}$. Similarly, depending upon the results of the input signals, either the functional block 444 or 446 is selected to provide $CBIT_{i+2}$. These two signals, $CBIT_{i+1}$ and $CBIT_{i+2}$ are applied to AND gates 460 and 462. Particularly, the AND gate 460 receives the inputs $CBIT_{i+1}$ and $REQBIT_{i+1}$, and supplies an output $SCRBIT_{i+1}$, the i+1 bit of the SC result word. Similarly, the AND gate 462 receives inputs $CBIT_{i+2}$ and $REQBIT_{i+2}$, and supplies an output $SCRBIT_{i+2}$. As illustrated in the circuit diagram of FIGS. 12A and 12B, the $REQBIT_{i+2}$ is provided from the next carry generation unit 400 that receives it as a direct input. Of course, in other embodiments, $REQBIT_{i+2}$ could be supplied directly as an input to the unit using it, instead of originating at the next unit. The operations in the four carry generation blocks 440, 442, 444, and 446 described above with reference to FIG. 13 are repeated in each of the two-bit carry generation units 402. A circuit diagram of the carry generation unit 402 is described below.

Reference is made to FIG. 14 which is a circuit diagram of the carry generation unit 402 in the preferred embodiment. The final carry generation unit 404 is similar to the two-bit carry generation unit 402, and therefore it will be described subsequently, still with reference to FIG. 14. Although the initial carry generation unit 406 could be implemented with a carry generation unit 402, its required functions can be implemented with simplified circuitry that will be described subsequently with reference to FIG. 15. Each of the functional blocks 440, 442, 444, and 446 in FIG. 13 is implemented in a single logic level in FIG. 14. The outputs CS1B, CSOB, CS2B, and CS2 of FIG. 14 are ordered from top-to-bottom identically with FIGS. 12A and 12B.

The inputs at the bottom of FIG. 14 correspond to the inputs along the left side of FIG. 13. The input B0 is supplied to an inverter 500. The output of the inverter 500 is supplied to the multiplexer tree 448. The outputs of the blocks 440, 442, 444, and 446 in FIG. 14 are inverted from their values in FIG. 13. However, the NOR gates 460, 462 to be described re-invert the selected value, thereby performing an equivalent function.

A NOR gate 502 is connected to the input B0 and A0. This supplies the result in the second carry generation block 442. The inputs to a third circuit 504 include B0, B1, and A1. The third circuit 504 supplies the function described in the functional block 444, specifically it performs the function (B1 or (B0 and A1)) and inverts the output, which can be implemented in a single complex gate. A fourth circuit 506 is connected to receive the input B0 and B1, and the inverted inputs A0 and A1. The fourth circuit 506 performs the function (B1 or (B0 and A1) or (A0 and A1)) and inverts the output, which is implemented in a single complex gate. Each of these four circuits 500, 502, 504, and 506 supplies an output to a multiplexer tree 448 that includes a plurality of multiplexers. Particularly, the inverter 500 supplies an output on a line 510 to a first 2-to-2 multiplexer 512 that is controlled by control signals CSOB and CS1B. The 2-to-2 multiplexer 512 has identical construction with MUXP2X 412 in FIG. 18. The NOR gate 502 also supplies an input on a line 514 to the 2-to-2 multiplexer 512. A selection is made and supplied from the first 2-to-2 multiplexer 512 to a first 2-to-1 multiplexer 516.

From the third circuit 504, an output is provided on a line 520 to a second 2to-2 multiplexer 522 within the multiplexer tree 448. The fourth circuit 506 also supplies an output on a line 524 to the second 2-to-2 multiplexer 522. The second 2-to-2 multiplexer 522 is controlled by the control signals CSOB and CS1B. A selection is made in the second 2-to-2 multiplexer 522 and supplied to a second 2-to-1 multiplexer 532.

The output of the first 2-to-1 multiplexer 516 is applied to a NOR gate 540 whose other input is the output from the third circuit 504 on the line 520. The output of the second 2-to-1 multiplexer 532 is supplied to a second NOR output gate 542 whose other input is the A2 signal, which is the inverted request bit from the next bit position. The NOR gates 540 and 542 function to perform the AND operation with inverted inputs, particularly the NOR gate 540 performs the function of the AND gate 460 in FIG. 13 with inverted inputs, and the NOR gate 542 performs the function of the AND gate 462 and FIG. 13 with inverted inputs. The output of the NOR gate 540 is labeled R0, and the output of the NOR gate 542 is labeled R1. Furthermore, the output $COUT_0^*$ is supplied from the line 524, and the output $COUT_1^*$ is supplied from the line 520. As discussed earlier, outputs on the lines 524, 520 are inverted from the value shown in FIG. 13. These two outputs are supplied with inverted values to the multiplexer tree 410 for reasons peculiar to the design of the preferred embodiment. The multiplexer tree 410 takes this into account in its design.

The final carry generation unit 404 will be described with reference to FIG. 14. The final carry generation unit 404 omits the conditional outputs $COUT_0$ and $COUT_1$ because they are not used by any subsequent carry generation unit 402 and are therefore unnecessary. However, the final carry generation unit 404 outputs the carryout bit from the output $SCRBIT_{31}$ which is used to select the grant word as described elsewhere. The final carry generation unit grant word as described elsewhere. The final carry generation unit 404 has another output designated $\overline{SCRBIT}_{31}$ that supplies the complement of the carryout bit. The $\overline{SCRBIT}_{31}$ output is applied to the multiplexer 46 (FIG. 2) together with the carryout bit from the output S31 in order to strengthen the control signal for the preferred embodiment in which the multiplexer 46 (FIG. 2) has dual control inputs that accept complementary signals. In the final carry generation unit 404, the $\overline{SCRBIT}_{31}$ output is supplied from another branch in the multiplexer tree 448 (FIGS. 13 and 14). This third branch receives inverted inputs from the output of the second 2-to-2 multiplexer 522. These inverted inputs are supplied to a third 2-to-1 multiplexer (not shown) whose output is $SCRBIT_{31}$. The output of the second 2-to-1 multiplexer 532 in the case of the final carry generation unit 404 is $\overline{SCRBIT}_{31}$. Thus, the bits $\overline{SCRBIT}_{31}$ and $SCRBIT_{31}$ are supplied quickly, at about the same time, and in complementary form for fast switching of the multiplexer 46.

Reference is now made to FIG. 15 which is a circuit diagram of the initial carry generation unit 406, which is labeled GNTGEN-INIT in FIG. 12B. For the initial carry generation unit 406, the circuit of FIG. 14 is simplified because the carryin bit is assumed to be "0". Therefore, the blocks 442 and 446, which assume a carryin bit of "1", can be omitted, as well as the multiplexer tree 448. The input B0 is supplied to an inverter 600 which is supplied to a NOR gate 602. The other input to the NOR gate 602 is the input A1 which has been inverted by an inverter 604. The output of the NOR gate 602 supplies the output G0, which is the carry out from the first bit position "0". It should be remembered that the initial carry generation unit 406 described herein assumes that the carryin bit is "0".

The carryout from the other bit position -position "1"-is supplied from the output G1. To supply this output, a complex gate 606 receives inputs including B1, A1, and B0. The output is supplied to a NOR gate 610 which has another input A2. The NOR gate 610 supplies the output G1.

The carry bits are supplied from outputs labeled CI and CIB. The output signal CIB is provided from a complex gate 612 that is identical with the complex gate 606 and its inputs are also identical. The output of the complex gate 612 is the CIB signal. A complex gate 614 is connected to inputs including B1, A1 and B0. The output of this complex gate 614 supplies the output CI. The output signals CI and CIB are complementary, and are supplied to the multiplexer tree 410 illustrated in FIG. 12A and 12B.

Preferably, the circuit of FIGS. 12A, 12B, 13, 14, 15, and 16 is implemented on a single semiconductor chip. Such an implementation reduces the length of lines for higher performance and saves space. However, it will be apparent that in other embodiments, one or more discrete components may be utilized to form the circuit illustrated therein.

From the above description, it will be apparent that the invention disclosed herein provides a novel and advantageous round robin scheduler. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A conditional carry scheduling unit in a round robin scheduler that performs a scheduling cycle to schedule use of a shared resource to one of a plurality of clients, each client j supplying a request bit $REQBIT_j$ that is asserted to request use of the shared resource, each client also having an input for receiving a grant bit $GNTBIT_j$ and circuitry responsive to an asserted $GNTBIT_j$ for using the shared resource during a subsequent communication cycle, said REQBITs and GNTBITs being arranged in a predetermined order of bit positions, said conditional carry scheduling unit supplying a scheduler carry result bit $SCRBIT_j$ for each client j, said conditional carry scheduling unit comprising:

a plurality of two-bit carry generation units for computing a $SCRBIT_{i+1}$ and a $SCRBIT_{i+2}$ from two adjacent bit positions i and i+1, each two-bit carry generation unit coupled to receive a $REQBIT_i$, a $GNTBIT_i$, a $REQBIT_{i+1}$, a $GNTBIT_{i+1}$, and a $REQBIT_{i+2}$, each two-bit carry generation unit also including a carry select CS input indicative of a carryin bit $CBIT_i$, each two-bit carry generation unit including a first conditional carry generation means responsive to said $GNTBIT_{i+1}$, $GNTBIT_i$, and $REQBIT_{i+1}$ for calculating a first conditional $CBIT_{i+2}$ that assumes $CBIT_i$ is zero and supplying a $COUT_0$ signal indicative of said first conditional $CBIT_{i+2}$;

a second conditional carry generation means responsive to said $GNTBIT_{i+1}$, $GNTBIT_i$, $REQBIT_i$, and $REQBIT_{i+1}$ for calculating a second conditional $CBIT_{i+2}$ that assumes $CBIT_i$ is one and supplying a $COUT_1$ signal indicative of said second conditional $CBIT_{i+2}$;

a third conditional carry generation means responsive to said $GNTBIT_i$ for computing a first conditional $CBIT_{i+1}$ that assumes $CBIT_i$ is zero, a fourth conditional carry generation means responsive to said $GNTBIT_i$ and $REQBIT_i$ for computing a second conditional $CBIT_{i+1}$ that assumes $CBIT_i$ is one, a multiplexer tree coupled to receive the first and second conditional $CBIT_{i+1}$, the first and second conditional $CBIT_{i+2}$, and the CS input indicative of $CBIT_i$, and responsive to said CS input for selecting a selected $CBIT_{i+1}$ and a selected $CBIT_{i+2}$, a first AND gate having inputs coupled to receive the selected $CBIT_{i+1}$ and the $REQBIT_{i+1}$ and outputting a $SCRBIT_{i+1}$, and a second AND gate having inputs coupled to receive the selected $CBIT_{i+2}$ and the $REQBIT_{i+2}$ and outputting a $SCRBIT_{i+2}$; and a carry lookahead multiplexer tree coupled to receive said $COUT_0$ and $COUT_1$ signals from each of said plurality of two-bit carry generation units and, responsive to said $COUT_0$ and $COUT_1$ signals, selecting one of said $COUT_0$ and $COUT_1$ signals in each of said plurality of two-bit carry generation units to supply the CS input to each two-bit carry generation unit.

2. A conditional carry scheduler that performs a scheduling cycle for N clients to schedule use of a shared resource to one of said N clients, each client j supplying a request bit $REQBIT_j$ that is asserted to request use of the shared resource, each client also having an input for receiving a grant bit $GNTBIT_j$ and circuitry responsive to an asserted $GNTBIT_j$ for using the shared resource during a subsequent communication cycle, said REQBITs and GNTBITs being arranged in a predetermined order of bit positions from 1 to N, said conditional carry scheduler comprising:

a scheduler carry branch including a carry look ahead multiplexer tree and a plurality of two-bit carry generation units including an initial carry generation unit;

said initial carry generation unit including means responsive to $REQBIT_1$, $REQBIT_2$, $GNTBIT_1$, and $GNTBIT_2$, for calculating a carryout bit $CBIT_3$ from bit position 2, assuming that the carryin bit to said initial carry generation unit is zero, and supplying said calculated $CBIT_3$ to said multiplexer tree;

said plurality of two-bit carry generation units for computing a $SCRBIT_{i+1}$ and $SCRBIT_{i+2}$ from two adjacent bit positions i and i+1, each two-bit carry generation unit coupled to receive a REQBIT$_i$, a GNTBIT$_i$, a REQBIT$_{i+1}$, a GNTBIT$_{i+1}$, and a REQBIT$_{i+2}$, each two-bit carry generation unit also including a carry select CS input indicative of a carryin bit CBIT$_i$, each two-bit carry generation unit including a first conditional carry generation means responsive to said GNTBIT$_{i+1}$, GNTBIT$_i$, and REQBIT$_{i+1}$ for calculating a first conditional CBIT$_{i+2}$ that assumes CBIT$_i$ is zero and supplying a COUT$_0$ signal indicative of said first conditional CBIT$_{i+2}$;

a second conditional carry generation means responsive to said GNTBIT$_{i+1}$, GNTBIT$_i$, REQBIT$_i$, and REQBIT$_{i+1}$ for calculating a second conditional CBIT$_{i+2}$ that assumes CBIT$_i$ is one and supplying a COUT$_1$ signal indicative of said second conditional CBIT$_{i+2}$;

a third conditional carry generation means responsive to said GNTBIT$_i$ for computing a first conditional CBIT$_{i+1}$ that assumes CBIT$_i$ is zero, a fourth conditional carry generation means responsive to said GNTBIT$_i$ and REQBIT$_i$ for computing a second conditional CBIT$_{i+1}$ that assumes CBIT$_i$ is one, a multiplexer tree coupled to receive the first and second conditional CBIT$_{i+1}$, the first and second conditional CBIT$_{i+2}$, and the CS input indicative of CBIT$_i$, and responsive to said CS input for selecting a selected CBIT$_{i+1}$ and a selected CBIT$_{i+2}$, a first AND gate having inputs coupled to receive the selected CBIT$_{i+1}$ and the REQBIT$_{i+1}$ and outputting a SCRBIT$_{i+1}$, and a second AND gate having inputs coupled to receive the selected CBIT$_{i+2}$ and the REQBIT$_{i+2}$ and outputting a SCRBIT$_{i+2}$;

said carry lookahead multiplexer tree coupled to receive said COUT$_0$ and COUT$_1$ signals from each of said plurality of two-bit carry generation units and, responsive to said COUT$_0$ and COUT$_1$ signals, selecting one of said COUT$_0$ and COUT$_1$ signals in each of said plurality of two-bit carry generation units to supply the CS input to each two-bit carry generation unit.

3. The conditional carry scheduling unit of claim 1 wherein:

said first conditional carry generation means calculates CBIT$_{i+2}$ in accordance with a first relation:

$$CBIT_{i+2} = GNTBIT_{i+1} + GNTBIT_i REQBIT_{i+1};$$

said second conditional carry generation means calculates CBIT$_{i+2}$ in accordance with a second relation:

$$CBIT_{i+2} = GNTBIT_{i+1} + GNTBIT_i REQBIT_{i+1} + REQBIT_i REQBIT_{i+1};$$

said third conditional carry generation means calculates CBIT$_{i+1}$ in accordance with a third relation:

$$CBIT_{i+1} = GNTBIT_i; \text{ and}$$

said fourth conditional carry generation means calculates CBIT$_{i+1}$ in accordance with a fourth relation:

$$CBIT_{i+1} = GNTBIT_i + REQBIT_i$$

4. An apparatus comprising:

a shared resource;

a plurality of clients coupled to said shared resource, each client j supplying a request bit REQBIT$_j$ that is asserted to request use of the shared resource, each client also having an input for receiving a grant bit GNTBIT$_j$ and circuitry responsive to an asserted GNTBIT$_j$ for using the shared resource during a subsequent communication cycle, said REQBITs and GNTBITs being arranged in a predetermined order of bit positions;

a round robin scheduler coupled to said shared resource and said plurality of clients, said round robin scheduler including a conditional carry scheduling unit supplying a scheduler carry result bit SCRBIT$_j$ for each client, said conditional carry scheduling unit comprising a plurality of two-bit carry generation units for computing a SCRBIT$_{i+1}$ and a SCRBIT$_{i+2}$ from two adjacent bit positions i and i+1, each two-bit carry generation unit coupled to receive a REQBIT$_i$, a GNTBIT$_i$, a REQBIT$_{i+1}$, a GNTBIT$_{i+1}$, and a REQBIT$_{i+2}$, each two-bit carry generation unit also including a carry select CS input indicative of a carryin bit CBIT$_i$, each two-bit carry generation unit including a first conditional carry generation unit responsive to said GNTBIT$_{i+1}$, GNTBIT$_i$, and REQBIT$_{i+1}$ for calculating a first conditional CBIT$_{i+2}$ that assumes CBIT$_i$ is zero and supplying a COUT$_0$ signal indicative of said first conditional CBIT$_{i+2}$;

a second conditional carry generation unit responsive to said GNTBIT$_{i+1}$, GNTBIT$_i$, REQBIT$_i$, and REQBIT$_{i+1}$ for calculating a second conditional CBIT$_{i+2}$ that assumes CBIT$_i$ is one and supplying a COUT$_1$ signal indicative of said second conditional CBIT$_{i+2}$;

a third conditional carry generation unit responsive to said GNTBIT$_i$ for computing a first conditional CBIT$_{i+1}$ that assumes CBIT$_i$ is zero, a fourth conditional carry generation unit responsive to said GNTBIT$_i$ and REQBIT$_i$ for computing a second conditional CBIT$_{i+1}$ that assumes CBIT$_i$ is one, a multiplexer tree coupled to receive the first and second conditional CBIT$_{i+1}$, the first and second conditional CBIT$_{i+2}$, and the CS input indicative of CBIT$_i$, and responsive to said CS input for selecting a selected CBIT$_{i+1}$ and a selected CBIT$_{i+2}$, a first AND gate having inputs coupled to receive the selected CBIT$_{i+1}$ and the REQBIT$_{i+1}$ and output a SCRBIT$_{i+1}$, and a second AND gate having inputs coupled to receive the selected CBIT$_{i+2}$ and the REQBIT$_{i+2}$ and output a SCRBIT$_{i+2}$; and said round robin scheduler also comprising a carry lookahead multiplexer tree coupled to receive said COUT$_0$ and COUT$_1$ signals from each of said plurality of two-bit carry generation units and, responsive to said COUT$_0$ and COUT$_1$ signals, selecting one of said COUT$_0$ and COUT$_1$ signals in each of said plurality of two-bit carry generation units to supply the CS input to each two-bit carry generation unit.

5. A conditional carry scheduling method for a round robin scheduler that performs a scheduling cycle to schedule use of a shared resource to one of a plurality of clients, each client j supplying a request bit $REQBIT_j$ that is asserted when use of the shared resource is requested, each client also having an input for receiving a grant bit $GNTBIT_j$ and circuitry responsive to an asserted $GNTBIT_j$ for using the shared resource during a subsequent communication cycle, said REQBITs and GNTBITs being arranged in a predetermined order of bit positions, said conditional carry scheduling method supplying a scheduler carry result bit $SCRBIT_j$ for each client j, said conditional carry scheduling method comprising the steps of:

a) supplying a $REQBIT_i$, a $GNTBIT_i$, a $REQBIT_{i+1}$, a $GNTBIT_{i+1}$ from two adjacent bit positions i and i+1, a $REQBIT_{i+2}$ from the next adjacent bit position, and a carry select CS input indicative of a carryin bit $CBIT_i$ to each of a plurality of two-bit carry generation units; and b) responsive thereto, computing a $SCRBIT_{i+1}$ and a $SCRBIT_{i+2}$ in each two-bit carry generation unit.

6. The conditional carry scheduling method of claim 5 wherein said step b) further comprises the steps of:

b1) applying said $GNTBIT_{i+1}$, $GNTBIT_i$, and $REQBIT_{i+1}$ to calculate a first conditional $CBIT_{i+2}$ that assumes $CBIT_i$ is zero and supplying a $COUT_0$ signal indicative of said first conditional $CBIT_{i+2}$;

b2) applying said $GNTBIT_{i+1}$, $GNTBIT_i$, $REQBIT_i$, and $REQBIT_{i+1}$ to calculate a second conditional $CBIT_{i+2}$ that assumes $CBIT_i$ is one and supplying a $COUT_1$ signal indicative of said second conditional $CBIT_{i+2}$;

b3) applying said $GNTBIT_i$ to compute a first conditional $CBIT_{i+1}$ that assumes $CBIT_i$ is zero; and b4) applying said $GNTBIT_i$ and $REQBIT_i$ to compute a second conditional $CBIT_{i+1}$ that assumes $CBIT_i$ is one.

7. The conditional carry scheduling method of claim 6 further comprising the steps of:

c) applying said $COUT_0$ and $COUT_1$ signals from each of said plurality of two-bit carry generation units to a carry lookahead multiplexer tree in which one of said $COUT_0$ and $COUT_1$ signals are selected in each of said plurality of two-bit carry generation units to supply the CS input to each two-bit carry generation unit.

8. The conditional carry scheduling method of claim 7 further comprising the steps of:

d) applying the first and second conditional $CBIT_{i+1}$, the first and second conditional $CBIT_{i+2}$, and the CS input indicative of $CBIT_i$ to a multiplexer tree that selects a $CBIT_{i+1}$ and a $CBIT_{i+2}$, e) applying the selected $CBIT_{i+1}$ and the $REQBIT_{i+1}$ to a first AND gate and outputting a $SCRBIT_{i+1}$, and f) applying the selected $CBIT_{i+2}$ and the $REQBIT_{i+2}$ to a second AND gate and outputting a $SCRBIT_{i+2}$.

* * * * *

UNITED STATES PATENT AND TRADEMARK OFFICE
CERTIFICATE OF CORRECTION

PATENT NO. : 5,357,512
DATED : October 18, 1994
INVENTOR(S) : Manpreet S. Khaira, et al.

It is certified that error appears in the above-indentified patent and that said Letters Patent is hereby corrected as shown below:

| | | |
|---|---|---|
| Column 3, Line 50; | Delete "COLT$_0$"; | Insert in place thereof --COUT$_0$-- |
| Column 4, Line 39; | Delete "biffrid"; | Insert in place thereof --hifind-- |
| Column 6, Line 15; | Delete "biffrid"; | Insert in place thereof --hifind-- |
| Column 6, Line 28; | Delete "biffrid"; | Insert in place thereof --hifind-- |
| Column 6, Line 31; | Delete "biffrid"; | Insert in place thereof --hifind-- |
| Column 6, Line 61; | Delete "biffrid"; | Insert in place thereof --hifind-- |
| Column 11, Line 5; | Delete "biffrid"; | Insert in place thereof --hifind-- |
| Column 11, Line 66; | Delete "1 OF"; | Insert in place thereof --10F-- |
| Column 13, Line 44; | Delete "= 1"; | Insert in place thereof --g$_1$-- |
| Column 13, Line 53; | Delete "Hennessy"; | Insert in place thereof --<u>Hennessy</u>-- |
| Column 14, Line 10; | Delete "REQBIT$_i$"; | Insert in place thereof --$\overline{REQBIT}_i$-- |
| Column 14, Lines 17-18; | Delete "GNTBIT$_i$<u>REQBIT</u>$_i$ + 1 + REQBIT$_i$REQBIT$_i$ + 1"; | Insert in place thereof --GNTBIT$_i\overline{REQBIT}_i$ + 1 + $\overline{REQBIT}_i\overline{REQBIT}_i$ + 1-- |
| Column 14, Line 29; | Delete "REQBIT$_i$ + 1"; | Insert in place thereof --$\overline{REQBIT}_i$ + 1-- |
| Column 17, Line 55; | Delete "A0"; | Insert in place thereof --$\overline{A0}$-- |
| Column 17, Line 58; | Delete "A1"; | Insert in place thereof --$\overline{A1}$-- |
| Column 17, Line 60; | Delete "A1"; | Insert in place thereof --$\overline{A1}$-- |

UNITED STATES PATENT AND TRADEMARK OFFICE
CERTIFICATE OF CORRECTION

PATENT NO. : 5,357,512  
DATED : October 18, 1994  
INVENTOR(S) : Manpreet S. Khaira, et al.

Page 2 of 2

It is certified that error appears in the above-indentified patent and that said Letters Patent is hereby corrected as shown below:

Column 17, Line 63; Delete "A0 and A1"; Insert in place thereof --$\overline{A0}$ and $\overline{A1}$--

Column 17, Line 65; Delete "A1) or (A0 and A1)"; Insert in place thereof --$\overline{A1}$) or ($\overline{A0}$ and $\overline{A1}$)--

Column 18, Line 52; Delete "$31"; Insert in place thereof --S31--

Column 19, Line 8; Delete "A1"; Insert in place thereof --$\overline{A1}$--

Column 19, Line 17; Delete "A1"; Insert in place thereof --$\overline{A1}$--

Column 19, Line 18; Delete "A2"; Insert in place thereof --$\overline{A2}$--

Column 19, Line 25; Delete "B1, A1 and B0"; Insert in place thereof --$\overline{B1}$, A1 and $\overline{B0}$--

Column 21, Line 53; Delete "REQBITi + 1"; Insert in place thereof --$\overline{REQBIT}_{i+1}$--

Column 22, line 1; Delete "REQBIT:"; Insert in place thereof --$\overline{REQBIT}_i$--.

Signed and Sealed this

Tenth Day of October, 1995

Attest:

BRUCE LEHMAN

Attesting Officer

Commissioner of Patents and Trademarks